US 12,347,064 B2

(12) United States Patent
Morgan et al.

(10) Patent No.: US 12,347,064 B2
(45) Date of Patent: Jul. 1, 2025

(54) EFFICIENT GRAPHICAL PROCESSING IN 360-DEGREE SPHERICAL SPACE

(71) Applicant: OFF WORLD LIVE LIMITED, London (GB)

(72) Inventors: Campbell Morgan, London (GB); Finbar Mostyn William, London (GB); Maria Loks-Thompson, London (GB); Glenn Kirk, London (GB)

(73) Assignee: OFF WORLD LIVE LIMITED, London (GB)

( * ) Notice: Subject to any disclaimer, the term of this patent is extended or adjusted under 35 U.S.C. 154(b) by 199 days.

(21) Appl. No.: 18/043,803

(22) PCT Filed: Sep. 15, 2021

(86) PCT No.: PCT/GB2021/052391
§ 371 (c)(1),
(2) Date: Mar. 2, 2023

(87) PCT Pub. No.: WO2022/058725
PCT Pub. Date: Mar. 24, 2022

(65) Prior Publication Data
US 2023/0316457 A1     Oct. 5, 2023

(30) Foreign Application Priority Data
Sep. 18, 2020  (GB) ...................... 2014781

(51) Int. Cl.
*G06T 3/4038* (2024.01)
*G06T 3/40* (2024.01)
(Continued)

(52) U.S. Cl.
CPC ............. *G06T 3/4038* (2013.01); *G06T 3/40* (2013.01); *G06T 7/64* (2017.01); *G06T 7/73* (2017.01);
(Continued)

(58) Field of Classification Search
CPC ........... G06T 3/4038; G06T 3/40; G06T 7/64; G06T 7/73; G06T 2207/10016; G06T 2207/20212
See application file for complete search history.

(56) References Cited

U.S. PATENT DOCUMENTS

2012/0306904 A1*  12/2012  Francois ................. A63F 13/52
345/589
2017/0280126 A1    9/2017  Van der Auwera et al.
(Continued)

FOREIGN PATENT DOCUMENTS

GB           2518019 A       3/2015

OTHER PUBLICATIONS

Combined Search & Examination Report dated Feb. 3, 2021 from GB Application No. GB2014781.5.
(Continued)

*Primary Examiner* — Sing-Wai Wu
(74) *Attorney, Agent, or Firm* — INNOVATION CAPITAL LAW GROUP, LLP; Vic Lin

(57) ABSTRACT

A method and associated systems for implementing blur effects in 360-degree spherical space is disclosed. The method operates by identifying a pair of great circles 106 in a spherical view 100 which intersect orthogonally at a pixel (θ0,φ0) to which the blur effect is to be applied. The great circles are mapped to a two-dimensional representation 102 of the image data and used as orthogonal axes to define a blur area. In some examples a series of points (θi,φi) along each great circle 106 are extracted and used to form one-dimensional sampling arrays which are swept across the two-dimensional image data in two orthogonal directions.

17 Claims, 18 Drawing Sheets

(51) Int. Cl.
*G06T 7/64* (2017.01)
*G06T 7/73* (2017.01)
(52) U.S. Cl.
CPC ............... *G06T 2207/10016* (2013.01); *G06T 2207/20212* (2013.01)

(56) References Cited

U.S. PATENT DOCUMENTS

2020/0167948 A1 5/2020 Shimmoto et al.
2021/0303824 A1* 9/2021 Guérin ..................... G06T 7/97

OTHER PUBLICATIONS

Combined Search & Examination Report dated May 13, 2021 from GB Application No. GB2104321.1.
International Search Report & Written Opinion dated Mar. 2, 2022 from PCT Application No. PCT/GB2021/052391.

* cited by examiner

| Right | Left | Up |
|---|---|---|
| Down | Front | Back |

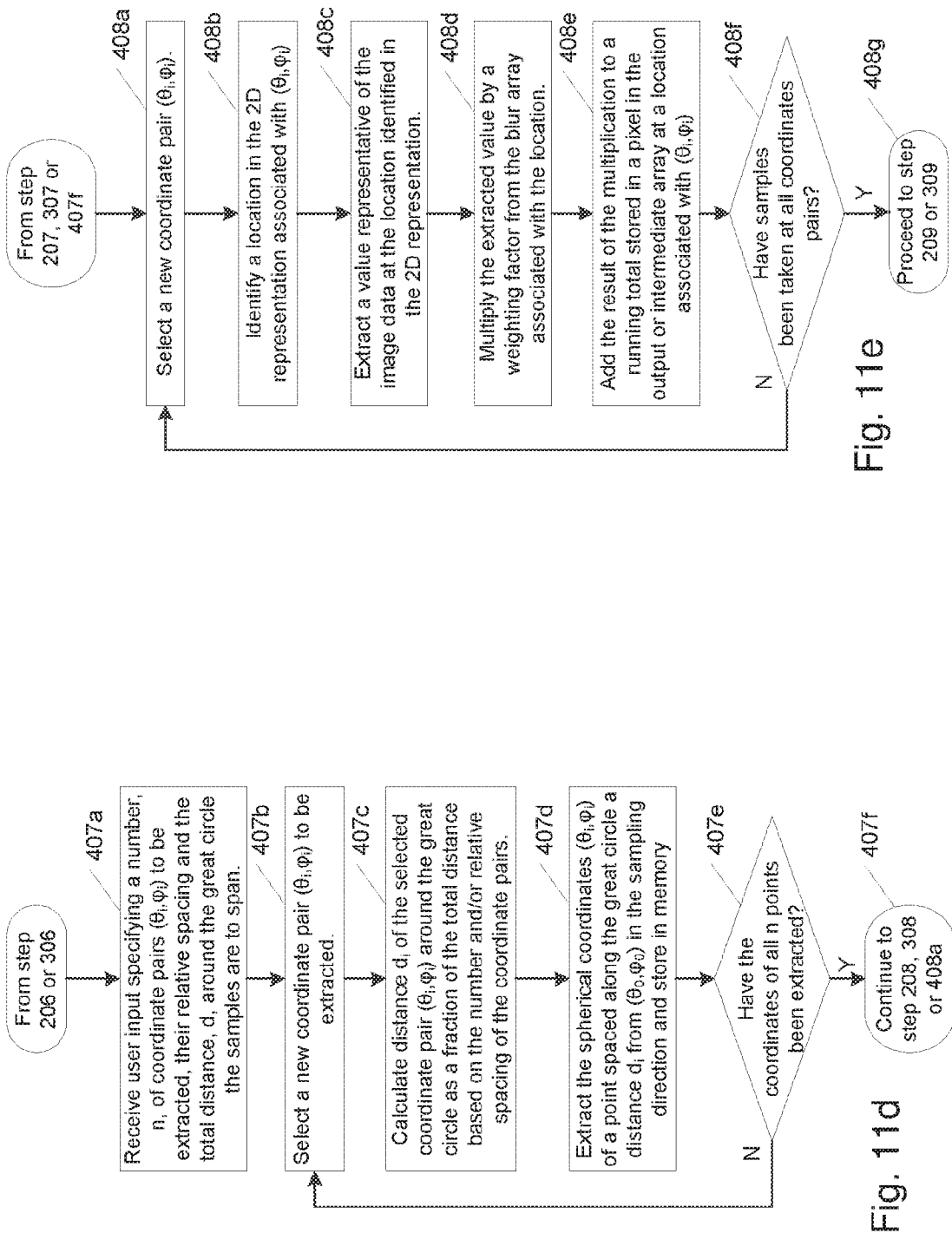

1. Use gaussian formula to generate array of $s$ sample values where $s$ is the per-pass blur radius 2. Store Source Cube Map Textures GPU Memory 3. Generate and store two equirectangular textures offset at 180 degrees GPU Memory 4. a. Use a bilinear sampler to resample each equirectangular texture at 50% resolution 4. b. Store in gpu memory as new texture GPU Memory 4. c. Repeat $n$ times where $n$ is number of downsample iterations

EFFICIENT GRAPHICAL PROCESSING IN 360-DEGREE SPHERICAL SPACE

This invention relates to methods of implementing graphical processing steps in 360-degree spherical space with improved efficiency. More particularly, the invention relates to efficiently implementing graphical processing steps such as blur and bloom effects using kernels spanning a large number of pixels in a manner which correctly presents scale and direction.

With the rise of, among other things, virtual reality (VR) and augmented reality (AR), an increasing need is seen for techniques which render graphics and apply graphical processing steps across an entire spherical space. For example, where a user of a VR or AR system has freedom to direct their view to any point on the inner surface of a virtual sphere—e.g. to centre their field of view along an arbitrary vector in three dimensional (3D) space—it is necessary (in principle at least) to render, apply processing to, etc. an entire spherical view.

The use of the phrase "entire spherical view" in this document refers to a solid angle subtending the full $4\pi$ sr (where sr indicates steradians, the SI unit for solid angles). Colloquially, this is referred to as 360-degree spherical space, and this custom is followed throughout this document.

The entire spherical view can be conveniently represented in 3D space as spherical polar coordinates on a sphere 100, as shown in FIG. 1. Conventionally the sphere 100 is taken to be a unit sphere (having radius, r, equal to 1), which allows a simplification of many useful mathematical expressions. Spheres herein will be taken to be unit spheres unless otherwise stated.

In FIG. 1, any point P on the surface of the sphere 100 is a distance r (equal to 1 in this case) from the centre of the sphere, O. Any point on the surface can be uniquely defined by a pair of angles, $(\theta,\varphi)$. The polar angle, $\theta$, tracks the angular spacing form the equatorial plane (sometimes referred to as the latitude), running from $\pi/2$ at the top of the sphere 100 (sometimes referred to as the North Pole) to $-\pi/2$ at the bottom of the sphere 100 (sometimes called the South Pole). The azimuthal angle $\varphi$ runs around the sphere 100 between a value of 0 and a value of $2\pi$. As used herein, all angles are measured in radians, unless otherwise stated. The line of constant $\theta$, at $\theta=0$, is sometimes referred to as the equator 102.

Note that due to the geometry of the sphere 100, it is entirely legitimate to talk about values of $\varphi$ greater than $2\pi$ (for example, motions which would result in an output of $\varphi$ greater than $2\pi$, or less than 0). It is apparent that doing so involves one or more full circuits of the sphere 100. In other words the net effect of such translations is to remove any full multiples of $2\pi$ and consider only the remainder. This can be used to map any value of $\varphi$ into the range 0 to $2\pi$. Processes also exist to ensure that $\theta$ remains between $\pi/2$ and $-\pi/2$, thereby providing a one-to-one mapping between all possible pairs of angles $(\theta,\varphi)$ and all possible points on the surface of the sphere 100.

As noted, when considering the surface of the sphere 100, the radius r is fixed, and only two parameters $(\theta,\varphi)$ are needed to fully map the space. In this sense it behaves somewhat like a two-dimensional (2D) space. However, it is also apparent that this 2D surface is curved and is therefore most accurately represented as a curved 2D surface embedded in 3D space.

While the spherical view is a convenient and intuitive coordinate system it is not the most convenient system for applying processing effects to image data because of the curvature discussed above, since graphical processing effects typically use a (flat) 2D kernel to apply a particular effect to a flat 2D image. Therefore, in order to apply any effect, the spherical coordinates are usually converted into a flat 2D representation.

FIG. 2 shows an example of one such representation—the equirectangular projection or equirectangular representation 120. The conversion from spherical polar to equirectangular is simple: the x-axis maps to the $\varphi$ parameter and the y-axis maps to the $\theta$ parameter, leading to an equator 102 running horizontally across the middle of the image (at $\theta=0$). Any given point P in this representation 120 is once more associated with a unique pair of angles $(\theta,\varphi)$, by analogy with the discussion in respect of FIG. 1. This simplicity makes the equirectangular projection 120 a common one to use for implementing image processing steps. However, as is clear from FIG. 2, the conversion causes distortion to the image data, which is particularly pronounced far from the equator.

This distortion is greatest at the poles (top and bottom of the representation 120) and derives at its heart from the fact that the distance travelled across the surface of the sphere in subtending a fixed $\varphi$ angle depends on the angle $\theta$ at which that travelling occurs, as can be clearly seen in FIG. 3. Broadly, the same $\varphi$ angle corresponds to progressively shorter distances travelled on the surface of the sphere 100 the further from the equator 120 travelling occurs.

In order to see this, consider the four points $P_1$, $P_2$, $P_3$ and $P_4$ on the surface of the sphere 100. $P_1$ and $P_2$ are located at the same $\varphi$ angle as one another, and separated by a certain angle in $\theta$. The same is true of the relationship between $P_3$ and $P_4$, or in other words, the line segments $P_1P_2$ and $P_3P_4$ are lines of constant longitude 106a, 106b. Similarly, $P_2$ and $P_4$ are located at the same $\theta$ angle as one another (at $\theta=0$, the equator 102), and separated by a certain angle in $\varphi$, while. $P_1$ and $P_3$ are both located on the line of constant latitude 104, and separated by that same angle in $\varphi$.

$P_1$ and $P_3$ are therefore separated by an angular difference between the two lines 106a, 106b of $\varphi$, which is the same angular distance as the angular distance between $P_2$ and $P_4$. However, since the full circumference of the equator 102 is larger than the full circumference of the constant latitude line 104, the arc segment $P_1P_3$ is shorter than the arc segment $P_2P_4$. In order to fit the image data from a spherical curved surface to a 2D rectangular array of pixels, the information spaced away from the equator is stretched to fill the available space, leading to distortion. This is the origin of the increasingly large distortion towards the poles in the equirectangular representation 120.

Another flat 2D representation of the 3D space is the cubemap projection, illustrated in FIG. 4. Here, a (virtual or real) camera captures six orthogonal viewpoints (each subtending solid angle $4\pi/6$ sr), one for each of a front (F), back (B), left (L), right (R), up (U) and down (D) view. Each camera records a flat 2D image which can be digitally stitched together to form a cube, the internal surface of which is used to approximate the internal surface of the sphere of the spherical polar representation. The cubemap projection makes it easy to separately record a series of views and stitch them together in an intuitive manner and for this reason it is commonly used for recording or creating content.

Nonetheless the cubemap projection, similarly to the equirectangular projection, suffers from distortion. FIG. 5 illustrates this, using a circle 100 to represent an idealised view in which each pixel is located the same distance from the viewing point, O, i.e. equivalent to the idealised sphere in FIG. 1.

However, because the centre of a cube face (the centre of the field of view of any one of the cameras) is closer to the camera than the corners are, each pixel in the cubemap subtends a larger solid angle near the centre of a cube face than it does near the edges 108 or corners 109. This leads to a given change in central angle α near the edges of the field of view of the camera resulting in the traversal of more pixels than the number of pixels traversed by the same change in central angle α nearer the centre of the field of view. Once more distortion occurs, but this time near the edge of each field of view, rather than at the poles, as in the equirectangular projection.

Typically content is provided in raw form in a cubemap projection, because this is a more intuitive manner in which to produce content, and is converted to an equirectangular projection for ease of processing.

It is common for graphical processing to make use of 2D kernels for manipulating the image data on a pixel-by-pixel basis. In flat 2D space this is a simple process as the x- and y-axes represent a natural orthogonal basis in which to mark out an area and process an area of pixels in a well-defined manner around a source pixel. Any 2D representation of 360-degree spherical space will introduce distortions, so while only two specific 2D projections have been discussed, it will be understood that any flat 2D projection of spherical image data necessarily introduces distortions into the flat 2D representation. These distortions translate directly into the graphical processing steps, leading to unnatural looking outputs even from well-understood processes.

Broadly these distortions belong to three categories (albeit with some degree of overlap): (1) reliable location of neighbouring pixels for the calculation; (2) locating nearby pixels outside of current cube face; and (3) issues related to incorrect notions of direction and distance of travel on a spherical surface when translated to a 2D representation.

Regarding issue (1), a prerequisite for implementing any processing step based on a 2D kernel on a spherical surface is reliably locating adjacent or nearby pixels within the region in which the effect is to be implemented. Mapping out an area of constant radius in flattened 2D space inevitably includes regions of distortion, with larger areas encompassing more distorted areas, and areas having greater distortion. In practice this means that a circle in a flattened 2D representation does not map to a circle on the surface of a sphere 100. As the viewer interprets the image data as representative of a spherical curved surface, a failure to properly render points of equal distance from a source (i.e. circles) in the 3D view lead to a sense of distortion in applied graphical processing effects. Effects rendered in this incorrect manner appear uneven or off centre, and it is not trivial to implement effects such as blur or bloom (a particularly wide-effect blur) correctly in flattened 2D space, while the correct (circular) region is easy to visualise on the surface of a sphere, but is not presented in a format which is amenable to efficient graphical processing methods based on 2D (flat) kernels.

The most obvious distortions become apparent as the point of interest nears the edges of each cube face in the cubemap representation. In FIG. 5, as a tends towards π/4 radians, each additional degree in rotation causes a non-linear increase in distance moved along the cube face (straight line $c_1c_2$), whereas the increase in distance moved along the arc between $c_1$ and $c_2$ is linear in angle α, for example.

For this reason, an approach of applying an image processing algorithm to textures composed of cube face projections will result in the perceived radius of the applied effect being decreased as it nears face edges. The effect is more pronounced the larger the radius of the applied effect and the closer it is implemented to the edge of a cube face. Similarly, if applied to an equirectangular projection, larger radius and proximity to the poles are indicators of large distortion.

As an example, the right hand part of FIG. 6 demonstrates how a fixed distance across a cube face in 2D space (shown in the left of the Figure)—will look to an observer who intuitively interprets the vision as projected in a spherical polar representation as in the right part of the Figure. Note that the view is mirrored as the cube face is viewed from the centre of the cube while the sphere 100 is shown from the outside. When the cube face is projected back onto the surface of a sphere, the distances across the surface of the sphere nearest the corner 109 is shorter than the distance nearer the centre of the face. The result when an effect is applied across an entire image will be artefacts in the form of large, visible distortions, especially noticeable if objects are moving around the point of interest in the 3D scene or if the processing steps are to be applied near the cube face edges 108 or corners 109. In the equirectangular representation 120 a similar effect occurs away from the equator and becomes worst nearest the poles.

For issue (2) note that there is some difficulty in correctly locating pixels on 2D cube map projections when the radius around a pixel being processed (the source pixel) extends outside the bounds of the source pixel's cube map face.

In FIG. 7, the source pixel P is located on the sphere 100 in the top right corner of a face (referred to in this discussion as the left face, for simplicity). The radius 110 of the effect is greater than the distance between the source pixel P and the boundary 108 between the left face and its adjacent face (referred to in this discussion as the left face, for simplicity). Thus, to apply an effect of radius 110 to a source pixel P it is necessary to correctly traverse from the left face to the front face and sample at the correct pixel in the 2D representation. The radius must be correctly calculated and in particular is not simply the distance across the cube face when projected in two dimensions; otherwise the effect becomes distorted in a similar manner to that described in respect of point (1) above. In traversing a cube face boundary 108, the distortion effect is necessarily worse as the pixels in question are necessarily near the boundary 108 where distortion is greatest.

In equirectangular projections there is only one discontinuity, traditionally located at φ=0 and equivalent to φ=2π, while the rest of the space is largely continuous (albeit close to the poles, e.g. θ=±π/2 certain operations can extend "beyond" the poles leading to "adjacent" pixels being located an angle of φ=π away from the source pixel). Even though there are fewer discontinuous regions in equirectangular projections compared with cubemap projections, any effect which must cross one of these discontinuities can lead to distortions unless pixels within the range of operation are correctly identified.

For point (3), consider FIG. 3 again. A naïve implementation of a 2D kernel might consider one dimension to be the x-axis and the other to be the y-axis, to form two nominally orthogonal axes as required to implement most kernels, and corresponding respectively to paths of constant φ and θ. However, while these are orthogonal at the source pixel (e.g. $P_1$) they do not accurately represent truly orthogonal paths.

The effect becomes pronounced as the radius over which the effect is applied (distance from the source pixel) increases. In other words, it is non-trivial to consistently move in perpendicular directions away from a point on the surface of the sphere 100. At the equator 102 of a sphere 100 an increase in the horizontal spherical coordinate $\varphi$ will translate a given point in a direction that is perpendicular to any separate translation represented by an increase in the angle of elevation, $\theta$. As angle of elevation ($\theta$) of the starting point tends towards 90°, a movement in horizontal rotation ($\varphi$) will increasingly bear away from a true perpendicular path for the reasons noted above. Indeed, it is not possible to use raw spherical coordinates ($\theta,\varphi$) themselves as a reliable measure of distance across the surface of a sphere. As noted above under point (1) it is also not possible to use pixel distances in the flat two dimensional space of cubemap or equirectangular projections as pixels do not have a linear relationship with distance travelled on a spherical surface.

Attempts to overcome these distortion effects tend to attempt to correct the symptoms (often using an approximation) rather than addressing the underlying causes, or make use of brute force methods to implement effects which look correct. These processes in turn tend not to be susceptible to leveraging in-built efficiencies of GPUs and instead fall back to CPU operations. Efficient utilisation of GPU functionality is crucial in implementing graphical processing steps having a large kernel, on a large number of source pixels, in high frame-per-second video streams in real time. Even in situations placing lower demands on hardware (processing single frames, low resolution video, etc.), it is clear that a more efficient method of identifying and processing pixels of interest is needed.

The present invention, which is set out in the appended claims, aims to address some or all of the problems identified above.

Disclosed herein is a method of applying a blur effect to image data representative of a 360-degree spherical space, the method comprising: (1) providing an input two-dimensional representation of the 360-degree spherical image data, the two-dimensional representation including a two-dimensional array of pixels, each pixel being associated with a ($\theta,\varphi$) coordinate pair, where $\theta$ is a polar angle and $\varphi$ is an azimuthal angle in a spherical polar coordinate representation of the 360-degree spherical image data; (2) creating a blurred two-dimensional representation of the 360 degree spherical image data by: (a) defining one or more blur arrays having weighting values for samples taken within a blur area around a source pixel; (b) identifying a source pixel in the input two-dimensional representation to which the blur effect is to be applied, the source pixel being associated with a spherical coordinate pair ($\theta_0,\varphi_0$); (c) defining a first great circle and a second great circle in the spherical polar coordinate representation, wherein the first and second great circles intersect orthogonally at ($\theta_0,\varphi_0$); (d) extracting a first spherical coordinate pair ($\theta_1,\varphi_1$) spaced away from ($\theta_0,\varphi_0$) around the first great circle a first distance $d_1$ in a first direction, and identifying a first location in the input two-dimensional representation corresponding to ($\theta_1,\varphi_1$); (e) extracting a second spherical coordinate pair ($\theta_2,\varphi_2$) spaced away from ($\theta_0,\varphi_0$) around the first great circle a second distance $d_2$ in a second direction opposite the first direction, and identifying a second location in the input two-dimensional representation corresponding to ($\theta_2,\varphi_2$); (f) extracting a third spherical coordinate pair ($\theta_3,\varphi_3$) spaced away from ($\theta_0,\varphi_0$) around the second great circle a third distance $d_3$ in a third direction, and identifying a third location in the input two-dimensional representation corresponding to ($\theta_3,\varphi_3$); (g) extracting a fourth spherical coordinate pair ($\theta_4,\varphi_4$) spaced away from ($\theta_0,\varphi_0$) around the second great circle a fourth distance $d_4$ in a fourth direction opposite the third direction, and identifying a fourth location in the input two-dimensional representation corresponding to ($\theta_4,\varphi_4$); (h) writing a blurred pixel value to a blurred pixel having a location associated with ($\theta_0,\varphi_0$) in the blurred two-dimensional representation of the 360-degree spherical image data, the blurred pixel value being a weighted average of pixel values in the input two-dimensional representation encompassed within an area having as its outer extent each of the first, second, third and fourth locations, the weightings for each pixel within the area being derived from the one or more blur arrays. A source pixel weighting value may be stored in one or more of the one or more blur arrays, or it may be stored separately entirely. In some cases, the source pixel is not directly sampled, instead merging the blurred pixel into the original input image to incorporate a value representative of the source pixel into the weighted average. The area within which a weighted average of pixel values is taken is sometimes referred to herein as a blur area.

By using two great circles which intersect orthogonally at the source pixel to determine the pixels to operate on, the above issues relating to correctly determining distance and direction are addressed. In particular, the above method maps out an area based on a correct notion both of "orthogonal" (to provide a 2D area in the correct way) and of distance—by mapping distance around the sphere to the distance over which the effect is intended to be implemented. Locations are found in the 2D representation and that location is used to determine the area over which a weighted sample is used instead of using locations derived from a naïve (undistorted, linear) notion of distance and direction in the 2D space. This necessarily ensures that the pixels which are sampled to form the weighted average leading to the blurred output pixel are located within an area which truly represents the intended area around the source pixel in terms of distance in particular directions.

While this has applicability for a wide range of graphical processing steps, it finds particular use in blur algorithms which may have a large radius of effect (for example in implementing the bloom effect as described in more detail herein). As noted above, large radius effects show the largest distortions both due to the increased likelihood that the affected area will cross a cube face boundary (in cubemap) or include areas close to the poles (in equirectangular) and also due to the wider radius highlighting the incorrect use of direction, and so are more susceptible to looking uneven unless the correct notions of distance and direction are used.

Every point on the surface of a sphere has an infinite number of great circles passing through it. In order to execute step (d), it is simple to pick any one of these great circles (extending through the point ($\theta_0,\varphi_0$) on a bearing of the user's choice). There is then exactly one other great circle which passes through ($\theta_0,\varphi_0$) at 90 degrees to that great circle. The user's choice in selecting the circle can be made for any reason, for example to assist in aligning the resulting lines in the 2D representation with a dimension of the 2D pixel array, or to simplify the calculation of the coordinate pairs along one or both of the great circles. As used herein in this context, "orthogonal" means close enough to $\pi/2$ (90 degrees) to not noticeably lead to distortion over the range of the blur radius. The closer to $\pi/2$, the more accurate the effect will be (particularly for longer range effects), but small deviations from exactly $\pi/2$ are unlikely to be noticeable and may in some cases provide a simplification to the calculations and improve computational efficiency.

Note that one way in which axes along which the locations at which pixel samples are taken within the area (for example at the four locations identified above) may not be completely orthogonal (i.e. lie exactly on the great circles determined in step (c)) even when viewed in the spherical representation is where the sampling locations do not align exactly with any pixel's nominal location. For example, a pixel is usually held to be nominally located at the centre of its area, even though it has 2D extent. This means that in general there is a vanishingly small probability that a line representing a great circle in the 2D representation will intersect the true centre of pixels. One way to deal with this issue is to "snap" the location to the centre of whichever pixel the determined sampling point falls within. This process is simple to achieve as any point is definitely within a given pixel (assuming that the probability of an arbitrary point landing exactly half way between two or more pixel centres tends towards zero as the location of that arbitrary point is specified at a resolution which increases without bound), but may lead to the line in 2D space not exactly following a path corresponding to that mapped out by the ideal great circle.

An alternative way to address this problem makes use of bilinear interpolation to provide a pixel sample at the exact determined location, i.e. on a line traced out in the 2D representation by one of the great circles. It is apparent that any location in the two-dimensional representation will fall within a rectilinear box formed by joining the centres of adjacent pixels in the vertical and horizontal directions (i.e. the sides of the box align with the edges of the pixels). The sample value can then be extracted as a weighted average of the four pixels whose centres form the corners of the box. The weighting values are easily calculated when the interpolation is bilinear (linear in vertical and horizontal directions), by dividing the rectilinear box into four rectangles, each rectangle having the sampling location at one of its corners and one of the pixel centres at the diagonally opposite corner. The weighting of a given pixel is proportional to the area of the rectangle which includes the diagonally opposite pixel centre as a corner. Modern GPU technology is specifically adapted to such calculations and is thus easily able to handle such computations at high speed.

The above discussion focuses on the nearest pixels to the point in 2D space corresponding to the point to be sampled. In some cases next-nearest pixel centres (and indeed next-next-nearest pixel centres and so on) may be included too, at progressively lower weightings, given their increased distance from the sampling location. A large number of iterations of this process is not desirable, as sampling pixels further and further out from a pixel sampling location starts to approximate a usual 2D blur kernel, but without the advantageous effects described herein in which the correct notion of distance and direction are used.

Of course, it is not necessary to use (bi)linear sampling, and in some cases, the weightings may be shifted to give different weights to different pixels, typically giving yet more weight to pixels whose centre is closer to the sampling location, although other methods may use non-linear sampling weights to adjust the sampling to account for local distortion of the 2D space. Note however, that in the extreme limit, giving more weighting to closer pixel centres tends towards to the "snap to nearest centre" approach described above.

The area over which the effect is applied can be determined in many ways. For example, a simple square, diamond or rectangle can be drawn by joining the four locations as corners or side centres. A circle or ellipse or other curved boundary can be fit to the points in other cases. While it will be appreciated that these methods are somewhat crude, the overall method of correctly identifying edge points by taking account of the distortion can provide a suitable blur effect, particularly where the blur weightings drop off as a function of distance, thus allowing a 2D blur array to be correctly applied to the area around any source pixel.

More accurate methods involve forming a grid of sampling points by drawing a series of lines parallel to the paths traced out by the great circles. Finally, for single pixel implementations of the method such as that described above, it may be possible to form an arbitrarily closely spaced grid by calculating a series of great circles, evenly spaced apart near the source pixel, by stepping along the first great circle in increments of the desired distance and at each increment drawing a great circle perpendicularly to the first great circle. By repeating the process, but stepping along the second great circle and finding a series of locally perpendicular great circles a grid can be formed of arbitrary density for identifying sampling locations in the 2D input representation. Other methods of defining an area in which the blur has an effect will be made clear below. For the avoidance of doubt, the source pixel is located inside the area, meaning that a value corresponding to a weighted sample of the value of the source pixel may therefore be included in the blurred pixel value.

Thus an advantage of the above method is clear: it provides an improved way to map out the 2D input space in terms of distance and direction, and thereby to apply a blur effect to individual pixels if desired. Of course where individual pixels are being operated on, it is unlikely that the processing steps will overload the processing hardware. As will be made clear, further features are disclosed herein which improve the efficiency of implementing the process over multiple, contiguous pixels. The fact that the output looks more natural, and is achieved using significantly simpler processing than known methods allows for the technical effect of improved efficiency, thereby providing a practical application of the method, and ensures that this is not merely an abstract set of operations.

The weighted average does not need to average all pixels, in some cases, only a subset of pixels may be sampled (e.g. on a grid, etc.), rather than sampling each pixel. Optionally a subset is sampled by setting the weighting to be 0 for pixels which are not intended to be sampled within the area. Commonly however, all pixels within the area are sampled in some format to implement the blur correctly, for example adjacent entries in the blur array move the sampling location by 1 pixel in a corresponding direction. In any case, the first to fourth distances $d_1$, $d_2$, $d_3$, $d_4$ represent the radius of effect of the blur in four directions (along two orthogonal axes in each direction), sometimes referred to as a local blur radius in each of the principal directions.

The blur arrays themselves define a pairing of distance (e.g. across the spherical surface) and corresponding weight at that distance for a series of samples (specifically for a number of samples equal to $n_1$, $n_2$, $n_3$ or $n_4$ as the case may be). Note that distance may alternatively be defined in terms of a normalised notion of pixels, or in any other suitable manner, depending on the context. For example, it may be desirable in some contexts to use the relationship between distance around the sphere at the equator ($\theta=0$) and the number of pixels traversed by a given angle in $\varphi$ as a benchmark for mapping spherical distance travelled to pixels traversed in a 2D representation. Since this is the region in which a given change in $\varphi$ corresponds to the largest distance travelled around the sphere, and therefore to a region of an equirectangular projection in which each pixel represents the largest distance around the surface. This is an appropriate region to use as a benchmark because it ensures if the number of samples taken is not larger than the number of pixels traversed at the equator, then this will be true at all points if the same mapping is used across the spherical surface. In other words, it is possible to ensure that the same pixel is never sampled twice.

In fact, the very notion of sampling described herein means that necessarily some sampling locations which are equal distance from the source pixel (in the spherical view) will not be the same distance as one another from the source pixel in the 2D representation. By using the adapted notions of distance set out in detail herein, the fact that a particular sample is taken more pixels away from the source pixel in a particular direction than another sample is taken exactly cancels the effect of the distortion in the 2D representation. Just as the distortion spreads out the visual information into certain regions, the use of a sampling area based on orthogonal great circles ensures that the sampling happens at the correct locations.

An example of blur effects to which this method is particularly applicable is bloom, in which a very bright region of an image appears to "bleed" out from its edges. Applying a bloom effect usually requires a wide, soft blur around the bright regions of an image. The methods described herein are therefore particularly suited to applying bloom in 360 degree spherical spaces, as the use of orthogonal great circles in the identification of pixels to sample as part of a blurring process allows the long range bloom effect to be implemented in a manner which looks natural. For the avoidance of doubt, blur processes in modern graphical processing at a particular location are performed by replacing pixels one by one with a weighted average of pixels which surround that location (including the pixel at the location itself) in the original image. Therefore, taking a weighted average of local pixels and implementing a blur effect around a given pixel are synonymous.

In some cases only a single blur array may be used in providing the weightings for the pixels to be sampled within the area. In such cases, the blur array may be two-dimensional, in essence providing individual weightings for each pixel within the area, or for each pixel to be sampled in the area. This allows freedom in preparing an array containing any values, although may come at a computational cost in terms of efficiency. Note that for situations in which isolated pixels are to be processed, this inefficiency is inevitable in the sense that a full 2D array is the only way to blur a single pixel (indeed the notion of blur applied to a single pixel arguably breaks down). Where blocks of contiguous pixels are to be blurred, greater efficiency may be achieved as explained in detail below.

The paths which the first and second great circles trace out are lines along which the blur array(s) operate(s) in the most general sense of the word "line". Specifically, "line" can of course be a curved path, as is the case for most great circles represented in equirectangular projections. In fact, only great circles extending through both poles of the sphere (and therefore having exactly two values of $\varphi$ around their circumference) appear straight in equirectangular projections.

In some cases, the method may be repeated on different source pixels, and/or on different images. In these cases, the user may choose to define the blur array(s) prior to step (2) of the method (rather than strictly in the sequence presented above). This can allow the array(s) to be defined once and used multiple times to cut down on unnecessary read/write operations, albeit at the loss of flexibility in choosing the blurring size and weights for each iteration. Even in cases where subsequent executions of the method make use of different blur arrays, it is likely that the user will define the weightings prior to execution of the method, since modern technology allows the method to execute far faster than a user can reasonably control in real time. Nevertheless, defining different arrays for use in different iterations provides flexibility in the application of the effect, at the cost of introducing additional read/write operations. Where contiguous pixels are processed together to improve efficiency, as set out below, using the blur array(s) which are substantially the same on each pixel is advantageous in terms of efficiency.

Note that as used herein, the $(\theta,\varphi)$ pairs are universal, in that they refer to a single point in any representation. In other words, any given $(\theta,\varphi)$ pair is a unique point representing at its core a single viewing direction (looking from the centre of the sphere to a point $(\theta,\varphi)$ on the surface of the sphere), and any two 2D representations having a pixel which maps to that $(\theta,\varphi)$ pair represent the same portion of the spherical image data. This allows the use of $(\theta,\varphi)$ pairs to identify corresponding portions of two different representations, for example two different versions of an equirectangular projection (e.g. one spanning $\varphi=0$ to $\varphi=2\pi$, another spanning $\varphi=-\pi$ to $\varphi=\pi$), portions of a cubemap representation which correspond to portions of an equirectangular representation, and so on.

As noted above, $\theta$ tracks latitude, effectively how far "North" or "South" a point is on the sphere, and $\varphi$ tracks longitude how far "East" or "West" a point is on the sphere, so lines of (locally) constant $\varphi$ run North-South, while lines of constant $\theta$ run East-West. It is also worth noting that $\varphi$ runs continuously around the sphere, so after a rotation of $2\pi$ you arrive back at the starting point. This means that where an operation causes $\varphi$ to increase beyond $2\pi$ or decrease below 0, the result should be taken modulo $2\pi$. That is, whole units of $2\pi$ are added or subtracted until the resulting value lies in the range $0 \leq \varphi < 2\pi$. Similarly, $\theta$ is antisymmetric about each pole, so an operation which causes $\theta$ to extend beyond $\pi/2$ or $-\pi/2$ by $\Delta\theta$ results in a location at $\theta=\pi/2-\Delta\theta$ or $-\pi/2+\Delta\theta$ respectively (and also shifts the $\varphi$ parameter by either adding or subtracting $\pi$; due to the modulo $2\pi$ effect described above it doesn't matter whether $\pi$ is added or subtracted).

This effect means that a plurality—actually, an infinite number—of $(\theta,\varphi)$ pairs map to any given pixel (e.g. $(\theta,\varphi)$, $(\theta,\varphi+2\pi)$, ... $(\theta,\varphi+2n\pi)$ for any integer n). For this reason, the ranges of $\theta$ and $\varphi$ are limited to their respective ranges and mapped back into these ranges using the formulae above, to ensure a one-to-one mapping. In any case, due to the manner in which the 2D arrays are constructed, each pixel is associated with exactly one $(\theta,\varphi)$ pair, which has $\theta$ and $\varphi$ values in their respective ranges: $-\pi/2 \leq \theta \leq \pi/2$ and $0 \leq \varphi < 2\pi$.

Given this universal notation, where a 2D array is made having the same pixel dimensions as another (as in the cases discussed herein), there is a one to one mapping between the two pixel arrays, each pixel representing the same location in viewing space, and thus storing the same visual information.

While the steps are presented in a particular order, we emphasise that this is indicative of the overall operations which are to be carried out and does not require that the steps are performed in this exact order.

As used herein, sampling is used in the commonly accepted sense of the world in the technical field of graphical processing. That is to say, sampling means taking a sample of a pixel by noting the properties of the pixel such as colour, intensity, hue, brightness, etc. of the pixel at that location. Multiplying by a weighting factor may include, for example, multiplying each of the R, G and B values by a constant value (usually less than 1) to form a new R, G, B vector. In some cases, the weighting factor may itself depend on R, G and B, so that the different colour channels are sampled and weighted differently from one another.

The blurred array may be initialised e.g. with all pixels set to a blank value, e.g. an RGB value of 0,0,0. This means that when the blur effect is applied, the method only outputs non-zero values for pixels corresponding to the source pixel(s). In other cases, the blurred representation may be a copy of the input representation, to result in only source pixels becoming blurred while the rest of the image is reproduced exactly as in the input. Note that the term "blurred 2D representation" does not mean that each pixel in the 2D representation has had the blur effect applied to it, merely that the desired pixel(s) has/have had the blur effect applied to them.

In cases where every pixel in the image data is processed, the result of the method is a 2D representation in which the effect has been applied in full to the whole image. In other cases, the result may be merged back into the input 2D representation to apply the calculated blurring effect to the original image data.

For example, the method may further comprise the step of: (3) merging the value of each pixel in the blurred two-dimensional representation into a corresponding pixel in the input two-dimensional representation. This allows the blur effect to be applied to the input 2D representation in cases where the blurred 2D representation does not include blurring effects applied to every pixel in the input image data. In cases where every pixel has had the blur effect applied to it, there may be no need to apply the merging step (3). This can be viewed as equivalent to a merging step where the relative weightings for the blurred 2D representation and the input 2D representation are 1 and 0 respectively.

As noted above, "corresponding pixel" means pixels having the same $(\theta,\varphi)$ as each other. Thus the merging happens on a pixel-by-pixel basis for pixels associated with the same spherical coordinates (and therefore with the same viewing direction, or viewing vector). The merging may be a simple adding of the pixel values (optionally with weightings selected by a user to control how strong the blur effect appears), or it may include a normalisation after the adding step, to ensure that pixels are output with appropriate levels of brightness, etc. In some cases, the merging step may vary depending on the pixel properties themselves, for example by considering the brightness of individual pixels.

Optionally in step (b) a plurality of source pixels are identified in the input two-dimensional representation to which the blur effect is to be applied, and step (2) is performed on each of the source pixels in turn to form the blurred two-dimensional representation.

Optionally, in step (b) every pixel in the input two dimensional representation is identified as a source pixel to which the blur effect is to be applied; wherein step (h) is achieved by performing steps (b) to (g) for each of the source pixels to form the blurred two-dimensional representation; wherein step (a) includes defining a first blur array having weighting values for samples taken along the first great circle and defining a second blur array having weighting values for samples taken along the second great circle; and wherein the method further includes forming an intermediate two-dimensional representation by: as part of step (d): (d1) extracting further spherical coordinate pairs $(\theta_{i,1}, \varphi_{i,1})$ to form a first series of spherical coordinate pairs spaced away progressively further from $(\theta_0,\varphi_0)$ around the first great circle in the first direction up to the first distance $d_1$ away from $(\theta_0,\varphi_0)$, the first series comprising a total of $n_1$ entries; (d2) identifying a series of locations in the input two-dimensional representation corresponding to each of the $n_1$ entries; (d3) associating each of the $n_1$ entries with a corresponding weighting value from the first blur array; (d4) extracting a sample from the input two-dimensional representation at a location associated with each of the spherical coordinate pairs $(\theta_{i,1},\varphi_{i,1})$; (d5) multiplying each sample by its corresponding weighting value from the first blur array; and (d6) summing the result of each multiplication in (d5) and storing the sum in an intermediate pixel having a location associated with $(\theta_0,\varphi_0)$ in an intermediate array of pixels; and as part of step (e): (e1) extracting further spherical coordinate pairs $(\theta_{i,2},\varphi_{i,2})$ to form a second series of spherical coordinate pairs spaced progressively further away from $(\theta_0,\varphi_0)$ around the first great circle in the second direction up to the second distance $d_2$ away from $(\theta_0,\varphi_0)$, the second series comprising a total of $n_2$ entries; (e2) identifying a series of locations in the input two-dimensional representation corresponding to each of the $n_2$ entries; (e3) associating each of the $n_2$ entries with a corresponding weighting value from the first blur array; (e4) extracting a sample from the input two-dimensional representation from a location associated with each of the spherical coordinate pairs $(\theta_{i,2},\varphi_{i,2})$; (e5) multiplying each sample by its corresponding weighting value from the first blur array; (e6) summing the result of each multiplication in (e5) and adding the sum to the value stored in the intermediate pixel; (e7) adding to the value stored in the intermediate pixel a pixel value indicative of the value of the source pixel in the input two-dimensional representation multiplied by a source pixel weighting value; and repeating steps (d) and (e) including their sub-steps (d1) to (d6), (e1) to (e7) for each pixel in the input two-dimensional representation to form the intermediate two-dimensional array of pixels; and wherein the method further includes: as part of step (f): (f1) extracting further spherical coordinate pairs $(\theta_{i,3},\varphi_{i,3})$ to form a third series of spherical coordinate pairs spaced progressively further away from $(\theta_0,\varphi_0)$ around the second great circle in the third direction up to the third distance $d_3$ away from $(\theta_0,\varphi_0)$, the third series comprising a total of $n_3$ entries; (f2) identifying a series of locations in the input two-dimensional representation corresponding to each of the $n_3$ entries; (f3) associating each of the $n_3$ entries with a corresponding weighting value from the second blur array; (f4) extracting a sample from the intermediate two-dimensional representation from a location associated with each of the spherical coordinate pairs $(\theta_{i,3},\varphi_{i,3})$; (f5) multiplying each sample by its corresponding weighting value from the second blur array; and (f6) summing the result of each multiplication in (f5) and storing the sum in an output pixel having a location associated with $(\theta_0,\varphi_0)$ in an output two-dimensional array of pixels; and as part of step (g): (g1) extracting further spherical coordinate pairs $(\theta_{i,4},\varphi_{i,4})$ to form a fourth series of spherical coordinate pairs spaced progressively further away from $(\theta_0,\varphi_0)$ around the second great circle in the fourth direction up to the fourth distance away from $(\theta_0,\varphi_0)$, the fourth series comprising a total of $n_4$ entries; (g2) identifying a series of locations in the input two-dimensional representation corresponding to each of the $n_4$ entries; (g3) associating each of the $n_4$ entries with a corresponding weighting value from the second blur array; (g4) extracting a sample from the input two-dimensional representation from a location associated with each of the spherical coordinate pairs $(\theta_{i,4},\varphi_{i,4})$; (g5) multiplying each sample by its corresponding weighting value from the second blur array; (g6) summing the result of each multiplication in (g5) and adding the sum to the value stored in the output pixel; (g7) adding to the value stored in the output pixel a pixel value indicative of the value of the source pixel in the input two-dimensional representation multiplied by a source pixel weighting value; and wherein steps (f) and (g) and their sub-steps (f1) to (f6), (g1) to (g7) are repeated for each pixel in the intermediate two-dimensional array, resulting in the output two-dimensional array of pixels being the blurred two-dimensional representation of step (h) in which each pixel in the input two-dimensional representation has been processed to provide a corresponding blurred pixel in the blurred two-dimensional representation.

It will be apparent that a simpler way to present the steps of this optional additional feature in combination with the broad formulation of the method described above is as a disclosure herein of a method of applying a blur effect to image data representative of a 360-degree spherical space, the method comprising: (1') providing an input two-dimensional representation of the 360-degree spherical image data, the two-dimensional representation including a two-dimensional array of pixels, each pixel being associated with a $(\theta,\varphi)$ coordinate pair, where $\theta$ is a polar angle and $\varphi$ is an azimuthal angle in a spherical polar coordinate representation of the 360-degree spherical image data; (2') defining a first blur array having weighting values for samples taken along a first great circle and defining a second blur array having weighting values for samples taken along a second great circle; (3') creating an intermediate two-dimensional representation of the 360 degree spherical image data by taking each pixel in the input two-dimensional representation as the source pixel in turn, each source pixel being associated with a spherical coordinate pair $(\theta_0,\varphi_0)$: (a') defining the first great circle and the second great circle in the spherical polar coordinate representation, wherein the first and second great circles intersect orthogonally at $(\theta_0,\varphi_0)$; (b1') extracting a first series of spherical coordinate pairs $(\theta_{i,1},\varphi_{i,1})$ spaced away from $(\theta_0,\varphi_0)$ around the first great circle in a first direction, the first series comprising a total of $n_1$ entries; (b2') identifying a series of locations in the input two-dimensional representation corresponding to each of the $n_1$ entries; (b3') associating each of the $n_1$ entries with a corresponding weighting value from the first blur array; (b4') extracting a sample from the input two-dimensional representation at a location associated with each of the spherical coordinate pairs $(\theta_{i,1},\varphi_{i,1})$; (b5') multiplying each sample by its corresponding weighting value from the first blur array; and (b6') summing the result of each multiplication in (b5') and storing the sum in an intermediate pixel having a location associated with $(\theta_0,\varphi_0)$ in an intermediate array of pixels; (c1') extracting a second series of spherical coordinate pairs $(\theta_{i,2},\varphi_{i,2})$ spaced away from $(\theta_0,\varphi_0)$ around the first great circle in a second direction opposite the first direction, the second series comprising a total of $n_2$ entries; (c2') identifying a series of locations in the input two-dimensional representation corresponding to each of the $n_2$ entries; (c3') associating each of the $n_2$ entries with a corresponding weighting value from the first blur array; (c4') extracting a sample from the input two-dimensional representation from a location associated with each of the spherical coordinate pairs $(\theta_{i,2},\varphi_{i,2})$; (c5') multiplying each sample by its corresponding weighting value from the first blur array; (c6') summing the result of each multiplication in (c5') and adding the sum to the value stored in the intermediate pixel; (c7') adding to the value stored in the intermediate pixel a pixel value indicative of the value of the source pixel in the input two-dimensional representation multiplied by a source pixel weighting value; and repeating steps (a'), (b1') to (b6') and (c1') to (c7') for each pixel in the input two-dimensional representation to form the intermediate two-dimensional array of pixels; creating a blurred two-dimensional representation of the 360 degree spherical image data by taking each pixel in the intermediate two-dimensional representation as the source pixel in turn, each source pixel being associated with spherical coordinate pair $(\theta_0,\varphi_0)$: (d1') extracting a third series of spherical coordinate pairs $(\theta_{i,3},\varphi_{i,3})$ spaced away from $(\theta_0,\varphi_0)$ around the second great circle in a third direction, the third series comprising a total of $n_3$ entries; (d2') identifying a series of locations in the input two-dimensional representation corresponding to each of the $n_3$ entries; (d3') associating each of the $n_3$ entries with a corresponding weighting value from the second blur array; (d4') extracting a sample from the intermediate two-dimensional representation from a location associated with each of the spherical coordinate pairs $(\theta_{i,3},\varphi_{i,3})$; (d5') multiplying each sample by its corresponding weighting value from the second blur array; and (d6') summing the result of each multiplication in (d5') and storing the sum in an output pixel having a location associated with $(\theta_0,\varphi_0)$ in a blurred two-dimensional array of pixels; and (e1') extracting a fourth series of spherical coordinate pairs $(\theta_{i,4},\varphi_{i,4})$ spaced away from $(\theta_0,\varphi_o)$ around the second great circle in a fourth direction opposite the third direction, the fourth series comprising a total of $n_4$ entries; (e2') identifying a series of locations in the input two-dimensional representation corresponding to each of the $n_4$ entries; (e3') associating each of the $n_4$ entries with a corresponding weighting value from the second blur array; (e4') extracting a sample from the input two-dimensional representation from a location associated with each of the spherical coordinate pairs $(\theta_{i,4},\varphi_{i,4})$; (e5') multiplying each sample by its corresponding weighting value from the second blur array; (e6') summing the result of each multiplication in (e5') and adding the sum to the value stored in the output pixel; (e7') adding to the value stored in the output pixel a pixel value indicative of the value of the source pixel in the input two-dimensional representation multiplied by a source pixel weighting value; and repeating steps (d1') to (d6') and (e1') to (e7') for each pixel in the intermediate two-dimensional array, to provide the blurred two-dimensional representation of the 360-degree spherical image data.

For the avoidance of doubt, processing each source pixel uses a different pair of great circles, because $(\theta_0,\varphi_0)$ is a unique identifier of a given source pixel. This means that the intersection point changes, and therefore the great circles change too. Once a first great circle is chosen for a particular source pixel in the input array, determining the second great circle is a unique choice. The pair of great circles may be selected as presented, or the second great circle may be selected as part of step (e). It can be advantageous for great circles for each source pixel to be related to one another. For example, the first great circle may be defined to always run "North/South", which provides a notion of parallel great circles for adjacent pixels. This can help implement the blurring effect more efficiently as described below.

The first and second blur arrays act orthogonally in the spherical space by virtue of their association with, respectively, the first and second great circles, so behave like the correct interpretation of two orthogonal axes. This in turn means that they can be used to define the decomposition of a separable 2D kernel. The two arrays are 1D in the sense that they operate along a line (contrast with a 2D array which specifies operations to be performed on every pixel in an area). This means that the two 1D arrays can be applied to the source pixels one array at a time to provide an effect which is equivalent to a full 2D array, but with fewer processing steps.

This is possible in the present method by selecting all of the pixels as source pixels and making the sampling axes orthogonal in spherical space—although they will not look orthogonal in the 2D representation due to the distortion inherent in 2D mappings of the spherical surface. Indeed, even the "straight line" on the surface is actually curved (since it is a great circle). In fact the concept of a straight line is generalised in curved space to the idea of a geodesic—in spherically curved space these take the form of great circles, which are circles on the surface of the sphere having the longest possible circumference ($2\pi r$, where r is the radius of the sphere).

When two 1D blur arrays operate in orthogonal directions, they can be applied sequentially to each pixel in a pixel array (or a subset in certain conditions), in the sense that one blur array can be applied to every pixel to form an intermediate pixel array, then the other blur array is applied to each pixel in the intermediate pixel array. The result of this process is mathematically equivalent to operating on the input pixel array with a convolution of the two 1D blur arrays. In other words:

$$(w_1 \ w_2 \ \ldots \ w_m) * \begin{pmatrix} w_a \\ w_b \\ \vdots \\ w_n \end{pmatrix} = \begin{pmatrix} w_1 w_a & w_2 w_a & \ldots & w_m w_a \\ w_1 w_b & w_2 w_b & \ldots & w_m w_b \\ \vdots & \vdots & \ddots & \vdots \\ w_1 w_n & w_2 w_n & \ldots & w_m w_n \end{pmatrix}$$

where "*" denotes the convolution operation, and the $w_i$ values represent weighting values for samples taken. Here, the m×1 blur array is convolved with a 1×n blur array to form an m×n blur matrix. Any of the blur arrays or the blur matrix are applied in broadly the same manner. A particular entry (usually the central entry) is placed over the source pixel. Pixels which correspond to (lie under) a weighting value are sampled, multiplied by their weighting value and added to a running total. When all pixels (including the source pixel) lying under the array have been sampled, weighted and summed, the total is recorded as the blurred version of the source pixel in a new array. The sequential use of two 1D arrays has the same effect as a single pass of the 2D matrix, but requires m+n samples per pixel on average, compared with m×n for the 2D matrix. Note that it is important that the two 1D arrays are orthogonal for this to work correctly.

In the language used above, this process effectively convolves the two blur arrays into a 2D array of dimension $(n_1+n_2+1)\times(n_3+n_4+1)$—where "+1" in each case accounts for the source pixel. This ties the size of the array to the blur radius. In this way the two 1D arrays define pixels in truly orthogonal directions which are necessarily within the blur area discussed above. Indeed, this additional feature provides a method to correctly implement this separable blur process in distorted 2D representations of the image data.

This thereby provides the technical effect of reducing the computational load and improving efficiency. The fact that the improved efficiency can be used directly to allow real time processing of data streams provides a practical application of the method, and ensures that this is not merely an abstract set of operations.

Note that while any two 1D arrays can be used to construct a 2D array, not all 2D arrays can be decomposed into a 1D array. An important point in this regard is that kernels for implementing natural looking blur effects are often decomposable into two 1D arrays, or looking at this in reverse, we can see that a natural looking blur can be provided in the present context by defining a pair of 1D blur arrays which convolve together to form a 2D array. Pixels to be sampled are then selected using the great circle method described above to ensure that the effective 2D array so formed is applied over the correct area, inherently accounting for distortion.

In some examples, there may be only one blur array, which is applied first in one direction, then rotated to apply to the orthogonal direction. In the convolution example above, this means that $w_1=w_a$, $w_2=w_b$, ..., $w_m=w_n$. This can save on calculation complexity by reusing blur arrays, and also allows commonly used blur arrays to be used, and reused if needed.

Note that while the above description involves taking four sets of samples consecutively: in each of two opposed directions along each of the two great circles, this is not necessary. In some cases, steps (d) and (e) (including their sub-steps) can be merged into a single step, taking samples along a line corresponding to the first great circle in both directions as part of a single process, and not consecutively as presented above. Similarly, the steps (f) and (g) (and their sub-steps) can be merged into a single step which takes samples along a line corresponding to the second great circle in both directions as part of a single process.

Note that the output 2D representation is not necessarily a final output, merely the result of applying the blur matrices to the input data. There may be further processing steps applied to the output pixel array to further change it.

As noted above, the blur effect may be applied to a subset of the input pixels, i.e. more than one pixel, but not all of the pixels. Many of the advantages set out herein relating to processing the whole of the input pixel array may also apply to the processing of multiple (but not all) pixels, if the multiple pixels are located in a contiguous area. In order to make use of the advantages in efficiency, rather than selecting just the area of interest (the area to be blurred), an extended area including the area of interest and a border around the region is determined and the blur effect applied to the extended area. The border should be at least large enough to allow $n_1$ samples (or extend a distance $d_1$) in the second direction, $n_2$ samples (or extend a distance $d_2$) in the first direction, $n_3$ samples (or extend a distance $d_3$) in the fourth direction and $n_4$ samples (or extend a distance $d_4$) in the third direction measured from the outer envelope of the pixels of interest. This means that pixels spaced away from the area of interest which would pick up some sampling do indeed pick up some sampling. Pixels outside the extended area are unaffected. By sweeping the blur arrays across the extended region as discussed above, the necessary visual information is processed correctly.

This process works yet better with the filtering step discussed below in detail. Alternatively, the weighting values for pixels in the border region can be adjusted to prevent blur effects from pixels outside the region of interest manifesting.

When processing only a subset of the full input array, selecting a larger contiguous region of pixels as a subset improves efficiency. This is because the border region does not change size appreciably when the area of interest increases. A larger area of interest increases the ratio of the area of interest to the border area. Also areas having fewer protrusions and/or recesses improve the above ratio for similar reasons.

The blur arrays themselves define a pairing of distance (e.g. across the spherical surface) and corresponding weight at that distance for a series of samples (specifically for a number of samples equal to $n_1$, $n_2$, $n_3$ or $n_4$ as the case may be). Note that distance may alternatively be defined in terms of a normalised notion of pixels, or in any other suitable manner, depending on the context. For example, it may be desirable in some contexts to use the relationship between distance around the sphere at the equator ($\theta=0$) and the number of pixels traversed by a given angle in $\varphi$ as a benchmark for mapping spherical distance travelled to pixels traversed in a 2D representation. Since this is the region in which a given change in $\varphi$ corresponds to the largest distance travelled around the sphere, and therefore to a region of an equirectangular projection in which each pixel represents the largest distance around the surface. This is an appropriate region to use as a benchmark because it ensures if the number of samples taken is not larger than the number of pixels traversed at the equator, then this will be true at all points if the same mapping is used across the spherical surface. In other words, it is possible to ensure that the same pixel is never sampled twice. In any case, there is an implicit link between the number of pixels away from the source pixel which will be sampled, and the distance travelled on the surface of the sphere. By altering these, the user can adjust how wide and smooth the blur effect looks.

In some cases, there may be some overlap in the values stored in the one or more blur arrays (or in portions of the same blur array), and in particular the first and second blur arrays may be identical. In this case, there may not actually be two distinct first and second blur arrays and a single array may be used for both operations. In fact, a single odd-numbered blur array may be defined and used repeatedly—e.g. twice, once oriented in a first orientation, and once oriented in a perpendicular orientation, or four times, once each for the positive and negative directions for the first orientation, once more for each of the positive and negative directions in the perpendicular orientation. In such cases, an entry representing a weighting for the source pixel, and each subsequent entry represents a weighting for progressively further out samples, irrespective of orientation and/or direction (that is, the same weightings are used for pixel samples taken in each direction/orientation). In such cases, the weighting for the source pixel may be selected to be lower than the desired overall output value to account for the fact that the source pixel is sampled multiple times.

The index "i" is used for tracking the distinct coordinate pairs in each series and runs from 1 to the total number of members of that series. So for example, the first series of spherical coordinate pairs $(\theta_{i,1}, \varphi_{i,1})$ has $n_1$ members, meaning i runs from 1 to $n_1$, the members being: $(\theta_{1,1}, \varphi_{1,1})$, $(\theta_{2,1}, \varphi_{2,1})$, ... $(\theta_{n1,1}, \varphi_{n1,1})$. When considering the second series of spherical coordinate pairs $(\theta_{i,2}, \varphi_{i,2})$ there are $n_2$ members, and i runs from 1 to $n_2$, the members being: $(\theta_{1,2}, \varphi_{1,2})$, $(\theta_{2,2}, \varphi_{2,2})$, ... $(\theta_{n2,2}, \varphi_{n2,2})$, and so forth. In other words, index "i" is used to step through successive members of a set, but may refer to different members (indeed different sets) in different parts of this document. Implicitly each member of a series of coordinate pairs relates to a different location on the sphere. Thus the first series includes $(\theta_1, \varphi_1)$, and so on, but the labelling changes to $(\theta_{n1,1}, \varphi_{n1,1})$ as this is the furthest coordinate pair from $(\theta_0, \varphi_0)$, located a distance $d_1$ away. Corresponding comments apply in respect of the second to fourth series of coordinate pairs.

The sampling steps of two orthogonal 1D arrays are usually performed using one array in full, and then the other array in full (hence traversing along the first great circle in one direction and then in the other direction before doing the same thing on the second great circle). Other arrangements of calculation steps will be apparent which do not change the overall output.

Where the method describes sampling a pixel in the input two-dimensional representation associated with each of the spherical coordinate pairs, this simply means noting the contents of a pixel (or a weighted average of the nearest pixels) corresponding to the first coordinate pair in the series, doing the same for a second pixel, corresponding to the second coordinate pair, and so on, for a total number of $n_1$, $n_2$, $n_3$ or $n_4$ samples as the case may be. By "noting the contents", we mean simply recording the value (e.g. RGB components) of the pixel or pixels at that location.

Optionally at least one of the series of coordinate pairs is evenly spaced along its corresponding great circle. That is, one, some or all of the first, second, third or fourth series of coordinate pairs [$(\theta_{i,1}, \varphi_{i,1})$, $(\theta_{i,2}, \varphi_{i,2})$, $(\theta_{i,3}, \varphi_{i,3})$, $(\theta_{i,4}, \varphi_{i,4})$, respectively] is evenly spaced around its great circle. In other words any two adjacent coordinate pairs in such a series are spaced apart from each other by the same distance across the surface of the sphere. Optionally this is also the same distance as the closest point to $(\theta_0, \varphi_0)$ is spaced away from $(\theta_0, \varphi_0)$. This helps to ensure that the resulting effect looks smooth and natural.

Optionally the method further includes a filtering step performed prior to the execution of the method, the filtering step classifying each pixel in the input two-dimensional representation into at one of least two categories such that: locations in the input two-dimensional array corresponding to pixels in a first category are overwritten with empty pixels; and pixels from the input two-dimensional representation corresponding to pixels in a second category, different to the first category, are not modified.

This filtering (which occurs prior to constructing the additional 2D array) can allow the method to focus on pixels of a particular type. For example, for bloom effects, pixels having a brightness above a particular threshold (or brighter than other pixels by a particular amount) can be selected in this way. This allows the blurring effect due to the bright pixels to be calculated irrespective of the value of nearby pixels. Once the blur is calculated in this way it can be merged back into the input data to apply the bloom effect to the data. Thus the pixels which are far from bright spots remain empty during the process, and at the end, if they were initialised as 0,0,0 in the RGB scheme, a weighted blend of 0,0,0 into anything does not change the pixel into which that value is being merged. However, this is advantageous as the pre-filtering ensures that the whole 2D image can have the method applied to it, but the blurring will only manifest at or near (within a blur radius of) the pixels which survive the filtering. This means that for memory and computational load planning, the same amount of calculations are needed each time the method is run (because the same number of pixels—all of them—are sampled and blended). This ensures that the process remains synchronised. Of course, brightness is just one criterion, one which is suitable for implementing bloom, but other graphical processing algorithms may make use of other criteria for filtering.

By "empty pixels" or "null pixels", what is meant is ideally a null value, i.e. no data. Typically this might look like R,G,B=0,0,0, which is usually interpreted as a black pixel if it were to be displayed to a user, although the intermediate steps are not normally presented to a user.

For situations in which brightness is used as a filtering criterion, the method may further include a filtering step to classify each pixel in the input two-dimensional representation having a brightness value greater than or equal to a threshold into an ignore category and each pixel in the input two-dimensional representation having a brightness value less than the threshold into a null category, such that: locations in the input two-dimensional array corresponding to pixels in the null category are overwritten with empty pixels; and pixels from the input two-dimensional representation corresponding to pixels in the ignore category are left unchanged.

Optionally the spherical coordinate pairs are calculated using the reverse haversine formula; wherein, for each spherical coordinate pair: the distance of the spherical coordinate pair from $(\theta_0,\varphi_0)$ along its corresponding great circle is used as a distance input to the reverse haversine formula; and an angle between the corresponding great circle and a great circle of constant $\varphi$ measured at $(\theta_0,\varphi_0)$, the angle being the clockwise angle measured from the positive $\theta$ direction of the great circle of constant $\varphi$ to the portion of the corresponding great circle on which the spherical coordinate pair lies is used as a bearing input to the reverse haversine formula. For the avoidance of doubt, this refers to the four coordinate pairs defining the four locations, as well as to each coordinate pair in the four series of coordinate pairs. Great circles of constant $\varphi$ here mean great circles formed by changing only $\theta$. As noted elsewhere, great circles formed by changing only $\theta$ lead to great circles having exactly two values of $\varphi$, a value local to the point of interest and (having passed through the North or South Pole, a second value shifted by $\pi$ from the local value. In some cases, this is referred to as a great circle of (locally) constant $\varphi$.

The distance being defined this way ensures that the notion of distance translates correctly into the 2D representation. This definition of bearing follows the usual definition in which the clockwise angle (looking at the sphere from the outside) from north is used as bearing.

The reverse haversine formula allows the calculation of a spherical coordinate pair $(\theta_b,\varphi_b)$ which would be arrived at by starting at an initial point $(\theta_a,\varphi_a)$ on an initial bearing $\lambda$ (initial bearing is used because as noted above, direction is difficult to map and in general changes around a great circle; initial bearing is well-defined) and travelling along a great circle a distance d around a sphere of radius R. The formulae for $\theta_b$ and $\varphi_b$ are:

$$\theta_b = \sin^{-1}\left(\sin(\theta_a)\cdot\cos\left(\frac{d}{R}\right) + \cos(\theta_a)\cdot\sin\left(\frac{d}{R}\right)\cdot\cos(\lambda)\right)$$

and $$\varphi_b = \varphi_a + a\tan2\left(\sin(\lambda)\cdot\sin\left(\frac{d}{R}\right)\cdot\cos(\theta_a), \cos\left(\frac{d}{R}\right) - \sin(\theta_a)\cdot\sin(\theta_b)\right)$$

in which atan 2(y,x) is defined as the inverse tangent function $\tan^{-1}(y/x)$, in which the sign of both x and y (and not just whether they have the same or different sign) is used to allow a distinction between diametrically opposed angles to be output. A more general way of thinking about the bearing, $\lambda$, is as the angle measured clockwise on the outer surface of the sphere around the initial point $(\theta_a,\varphi_a)$ from the local $+\theta$ direction to the point $(\theta_b,\varphi_b)$.

The haversine formula (and the reverse haversine formula, of course) was originally used for navigation on the Earth's surface. This in turn led to complex formulations due to (a) the Earth being an oblate spheroid, not a perfect sphere, and (b) the radius of the Earth being a relevant factor (and which changes with location, due to point (a)). For the present purposes, the formula can be simplified greatly because the image data can be modelled as a perfect sphere, having radius 1. This means that for parts of the formula in which the central angle is required, when measured in radians, the central angle is simply equal to the distance travelled around the surface of the sphere, d, and parts of the formulae above where d/R appears can be replaced with simply d.

A core innovation in this disclosure, as it relates to sampling within a blur area, is the recognition of the haversine formula, traditionally used for navigation on the Earth's surface, to determine distance and direction correctly in 2D distorted representations of the 360 degree spherical image data. In fact, the more general use of great circle to map out lines of true orthogonality and correct distance in the 2D representation also achieves this goal. In brief, this opens up the field of image processing in 360 degree spherical image data to the use of 2D blur arrays, and in particular to the correct implementation of 2D blur arrays and even two 1D orthogonal blur arrays applied to these situations.

The above formulae appear to raise an issue at the North and South poles, in that there is no meaningful definition of bearing (every direction is either south or north respectively). For the present purposes this is not an issue since any pixel's location is taken to be at the centre of the pixel, while the very most northern (or southern) edge of the very most northern (or southern) pixels is located at the North (or South) pole. This means that the most northerly (or southerly) pixel locations are necessarily spaced from either pole by at least half a pixel's height, and a bearing is still able to be reliably taken.

Optionally the first great circle is a great circle having exactly two values of $\varphi$ around its full circumference. The only great circles having exactly two values of $\varphi$ are lines of constant longitude. The two values of $\varphi$ are necessarily separated by an angle of $\pi$, and the great circle runs north-south through both the North Pole and the South Pole. In some examples, the second great circle has this property, rather than the first great circle.

By aligning the great circles in this way, the conversion to an equirectangular system is simple because the points on the great circle running north-south all lie on a vertical line in the equirectangular representation, thus simplifying the calculations.

In these examples, each pixel will of course have its own unique values for $(\theta_0,\varphi_0)$ as the method is applied to it. Depending on the field of view of a user viewing the output of this method, the selection of source pixels to be processed may change, e.g. the method may only process pixels in or near (within a blur radius of) an actual or expected field of view of a use/game player, etc.

Optionally the 360-degree spherical image data is a single frame of a video and the method includes repeating the method for at least one subsequent video frame. In some examples, the method is applied to many frames of a video stream, or even to every frame in a video stream. By applying the effect to a video stream, a realistic virtual world can be rendered in real time, by making use of the improved efficiency provided by the present method. Here, references to subsequent video frames need not mean directly subsequent, merely another later video frame from the same stream.

Optionally, $n_1=n_2$ and/or $n_3=n_4$. That is the first and/or second blur array is symmetrical in number of entries about the source pixel. Optionally $n_1=n_3$ and $n_2=n_4$. This results in first and second blur arrays of equal length to one another, which in turn leads to an effective 2D kernel (by sweeping the two 1D kernels over source pixels) which is square, i.e. has equal extent in the two orthogonal directions. This is the form which most graphical processing kernels take. In some cases, $n_1=n_2=n_3=n_4$. This not only ensures a square effective 2D kernel, but further ensures the source pixel is in the centre of the effective 2D kernel. This provides a graphical processing effect which is applied symmetrically about a source pixel in both directions.

Similarly, in some cases, $d_1=d_2$ and/or $d_3=d_4$. That is the first and second locations and/or third and fourth locations are located the same distance from the source pixel as one another. Where this was phrased terms of two or more $n_i$ being equal, as above, meant that the same number of samples is taken either side of the source pixel (ensuring the same fineness of graduation between adjacent samples), ensuring that the distances $d_i$ are equal means that the effect is applied over an area which is symmetrical about the source pixel in the spherical view, but not necessarily in the (distorted) 2D representation. Similarly, in some cases $d_1=d_3$ and $n_2=d_4$. In yet further examples, $d_1=d_2=d_3=d_4$.

Optionally the weighting values in the first and/or second blur array(s) follow a Gaussian approximation. In cases where there is one or more blur array then the weighting values in at least one of the one or more blur arrays may follow a Gaussian approximation. This means that a smooth Gaussian function is binned into discrete pixel chunks to extract a weighting value at that distance from the source pixel. That is, as the sample location moves further from the source pixel, the weights drop off following (as closely as desired) a Gaussian form. 2D Gaussian blur arrays have the property that they are always separable into two 1D arrays (due to the mathematical properties of the Gaussian function), so is a convenient choice for a blur array as such arrays are easy to implement and allow a reduction in computational complexity by leveraging their separability.

A user can select a standard deviation for the Gaussian function. In conjunction with a user's selection of the number of pixels (or distance over which the effect is applied—e.g. the blur radius), this allows a user to determine how wide and soft the blur is. Note that these parameters are usually tied together, in the sense that it is common for the furthest out pixel to have a weighting value just above a certain threshold (after which further effects can be ignored). This deals with the fact that Gaussian extends to ±∞ in theory, and allows the function to be truncated beyond a point at which its effects would be negligible anyway.

In some examples, the first and second blur arrays are identical. In yet further examples, the second array is the first array, that is, the same array is used in both instances and only one array is defined. In cases where there is one or more blur array then there may be two blur arrays identical to each other.

Optionally, prior to implementing the method: raw input two-dimensional image data is successively downscaled one or more times to form a series of two or more two-dimensional representations at progressively coarser resolution, the method further including: starting with the coarsest two-dimensional representation in the series of two-dimensional representations as a selected two-dimensional representation: executing the method of any preceding claim on the selected two-dimensional representation as the input two-dimensional representation; upscaling the blurred two-dimensional representation output from the execution of the method on the selected two-dimensional representation; blending the result of the upscaling with the next most coarse input two-dimensional representation in the series of input two-dimensional representations; using the result of the blending step as a selected input two-dimensional representation and repeating the executing, upscaling, blending and using steps until on the final execution step the selected two-dimensional representation is based on the second least coarse two-dimensional representation and the final blending step blends the upscaled blurred two-dimensional representation with the raw input two-dimensional image data.

By "successively downscale", what is meant is that the input data is copied once and downscaled by a (user-determined) factor. Subsequent downscaling repeats this process taking the downscaled output from the previous downscaling, and downscaling that again by a factor, again determined by a user and optionally different from the previous factor. The result is a series of versions of the original input image data (including the original input data itself) at progressively coarser resolution. Usually the downscaling uses the same scaling factor in each iteration, usually 50% in each linear dimension (resulting in an output having a quarter of the number of pixels as the input). However, in some cases, the factor can be changed by a user to achieve a particular goal, if desired.

When the blurred 2D representation is upscaled again, this is to provide a version which has the same number of pixels as the 2D representation with which it is to be blended. Therefore, the scale factor for the upscaling is set to be the same number as the factor which led to that downscaled version.

Where the selected two dimensional representation is "based on" the second least coarse 2D representation, this means that it is the result of the second least coarse 2D representation derived directly from the first downscaling iteration, having had the blending step applied to it to incorporate blurring effects from yet coarser representations.

This process of repeatedly downscaling, blurring, upscaling and blending allows long range blur effects to be applied without requiring large numbers of pixels to be sampled, by noting that the pixels furthest from the source pixel (but still within the blur radius), contribute relatively little weight and occur in parts of the image where the Gaussian (or other blurring) function is not rapidly changing. There is therefore little need for highly detailed sampling in these regions. As the resolution increases, the actual distance from the source pixel decreases, leading to a finely grained blur in the parts of the blur area in which this is most important.

As an example, if 1000 pixels are to be sampled in any given direction, the baseline case (without down- and up-sampling) is to sample all 1000 pixels. Alternatively, the downsampling method described above can be employed with a per-pass blur radius of 2 pixels and 9 downsampling operations (giving a set of ten 2D representations) at a linear factor of two. The ninth iteration results in pixels occupying linear dimensions of $2^9=512$ times the original pixel lengths. The two pixels in the sampling array thus extend out to an original pixel distance of $512 \times 2=1024$ (which is at least as far as the 1000 pixels the method set out to be sampled). These are sampled in the usual manner, upscaled, blended and the next most coarse resolution (pixels having linear dimension of $2^8=256$ times the original pixel length) is sampled. This process repeats with 10 sampling operations, giving a total number of pixels sampled of 10 operations times 2 pixels per operation, or 20 samples, rather than the 1000 samples required without employing this method. Note that the down- and up-scaling process allows the method to use the highly optimised bilinear resampling methods available on modern GPUs to reduce the number of sampled pixels. Modern GPUs are designed to optimise processing of 2D textures and are able to reliably downsample and upsample using blending and interpolation steps. Instead of sampling all pixels within the blur radius, this multi-pass approach vastly reduces the sampling load.

The sampling weights for each pass and the blending weight of each upscaled output into the next most coarse representation can be chosen carefully in order to ensure that the final result approximates closely the result of sampling all 1000 pixels. This calculation can be performed in advance of the method to allow rapid, real-time processing of visual information.

In some cases a final execution of the method is performed on the result of the final blending step. That is the blurred version of the second most coarse 2D array is blended into the original input data, and a final blurring step is performed on the result. In some cases, this may not be necessary, depending on the intended effect and the careful choice of blending weights.

Optionally, each successive execution of the method uses the same first and second blur arrays. This simplifies the process by defining a single form for each of the two blur arrays and using the same arrays over and over. To be clear, the first and second blur arrays may be different from one another.

Optionally, each successive blending step uses a user-defined blending weight. As noted above, this provides the user with control over the feel of the blur effect, and allows a natural looking blur to be achieved while utilising the downscaling ability. In some examples of course it may be possible (or even desirable) to use the same blending weight each time, depending on the desired output.

Optionally the user-defined blending weight differs in at least two iterations of the blending step. In some cases, each blending step uses a different blending weight.

In some cases, the method comprises taking as an input a flat 2D representation in the cubemap format of the 360-degree spherical image data and prior to implementing the method of any preceding claim, converting the cubemap representation to the input two-dimensional representation of the 360-degree spherical image data. As noted above, the cubemap representation may be a preferred format for creating image streams. In such cases, the method may further comprise converting the blurred two-dimensional representation into a blurred cubemap representation. This is a simple inversion of the steps required to convert from the cubemap to the 2D representation in which the processing is implemented (e.g. an equirectangular representation) and allows the output to be fed back into the pipeline in a commonly accepted format.

Also disclosed herein is a method of applying a blur effect across a discontinuity in image data representative of a 360-degree spherical space, the method comprising: (1) providing an initial two-dimensional representation of the 360-degree spherical image data, the two-dimensional representation including a two dimensional array of pixels, each pixel being associated with a $(\theta,\varphi)$ pair, where $\theta$ is a polar angle and $\varphi$ is an azimuthal angle in a spherical polar coordinate representation of the 360-degree spherical image data; wherein the initial two-dimensional representation spans azimuthal angles continuously in the range $0 \leq \varphi \leq 2\pi$ and wherein the spherical image data presented at $\varphi=0$ represents the same image data as the image data presented at $\varphi=2\pi$; (2) providing a shifted two-dimensional representation of the 360-degree spherical image data, the two-dimensional representation including a two dimensional array of pixels, each pixel being associated with a $(\theta,\varphi)$ pair, where $\theta$ is a polar angle and $\varphi$ is an azimuthal angle in a spherical polar coordinate representation of the 360-degree spherical image data, wherein the shifted two-dimensional representation spans azimuthal angles continuously in the range $-\pi \leq \varphi \leq \pi$ and wherein the spherical image data presented in the range $-\pi \leq \varphi \leq 0$ represents the same image data as the image data presented at $\pi \leq \varphi \leq 2\pi$; (3) applying the blur effect to each of the initial and the shifted two-dimensional representations individually to provide an initial blurred and a shifted blurred two-dimensional representation respectively; and (4) forming an output two-dimensional representation by combining the initial blurred and the shifted blurred two-dimensional representations together using an initial combining weighting function and a shifted combining weighting function applied to the initial blurred and the shifted blurred two-dimensional representations respectively; wherein the initial combining function has a weighting minimum at pixels corresponding to $\varphi=0$ and at $\varphi=2\pi$; and the shifted combining function has a weighting minimum at pixels corresponding to $\varphi=-\pi$ and at $\varphi=\pi$.

In this example, the discontinuity in the initial 2D representation occurs at $0=\varphi=2\pi$. Similarly, there is a discontinuity in the shifted 2D representation at $-\pi=\varphi=\pi$. As noted above, blur effects frequently fail to implement properly across a discontinuity. This development overcomes that issue by ensuring that any point in the image space is at least $\pi/2$ away in azimuthal angle from a discontinuity by providing two representations offset from one another by $\pi$ in azimuthal angle. By combining the two versions and minimising the combining weighting at the discontinuities, artefacts arising from the discontinuity are reduced or eliminated. Combining in this context means adding together the two images on a pixel-by-pixel basis (matching pixels which correspond to the same $(\theta,\varphi)$ coordinates with one another), once the multiplication by the respective combining weighting functions has been performed.

Each of the combining weighting functions depends at least on azimuthal angle $\varphi$. The minimum of weighting is preferably zero, and a maximum ideally occurs at the face centre $\varphi=\pi$ in the initial 2D representation and $\varphi=0$ in the shifted 2D representation). Preferably, the maximum value is 1 at these locations for the respective weighting functions. However, in some cases, it may be possible to have a non-zero value at the discontinuity as the "correct" blur from the other representation can still dominate. Similarly, the maximum value need not be 1, as this can be corrected, e.g. by an optional normalisation step after the method has been executed.

In some cases, the initial and shifted combining functions sum to a constant value for every pixel in the array. This results in a final output weighting which has no dependence on $\varphi$, and thereby avoids artefacts which could otherwise appear as vertical streaks in the output. Advantageously the constant value is 1 so that the image remains unaltered save for the correct implementation of blur. Once more, a normalisation step can be used to correct any offsets which creep in due to the constant value differing from 1, if needed.

In general, if a function f is found to have a $\varphi$ dependence giving rise to the desired locations of minima and maxima for one of the combining weighting functions, then a complementary function for the other combining weighting function is simply a–f, in which a is a constant value, sometimes equal to 1, as noted above.

In some examples the initial and shifted combining functions are applied to their respective two-dimensional representations on a pixel by pixel basis, wherein the value of φ to which pixels correspond is extracted and initial combining function has the form:

$$\frac{1 - \cos\varphi}{2}$$

and wherein the shifted combining function has the form:

$$\frac{1 + \cos\varphi}{2}$$

in which φ represents the extracted value of φ to which the pixels correspond. This is a simple function to compute and clearly has the desired properties. Small amendments such as a scaling factor and the addition (or subtraction) of a constant value may be made to adapt the function to the desired setting. Other functions which may be used include variants on the Gaussian function, with a suitably chosen standard deviation.

Applying the blur effect in this context may include applying any one of the variants of the blurring method set out in detail above.

As noted above, the equirectangular representation is a particularly commonly used 2D representation, and in some examples of any of the methods discussed above, some or all of the two-dimensional representations may be equirectangular representations.

The present disclosure also extends to a computer program, computer program product or logic encoded in one or more tangible media for execution, which when executed is operable to implement the steps of any method set out above. In addition, the disclosure extends to a processor or distributed processing system coupled to a memory in which instructions are stored, the instructions when executed being operable to cause the processor or distributed processing system to implement the steps of the steps of any method set out above.

Specific examples will now be described in detail with reference to the accompanying Figures, in which:

FIG. 11d is a flow chart illustrating processing step 207 or 307 of FIG. 11b or 11c respectively;

FIG. 11e is a flow chart illustrating processing step 208 or 308 of FIG. 11b or 11c respectively;

Figure 1:
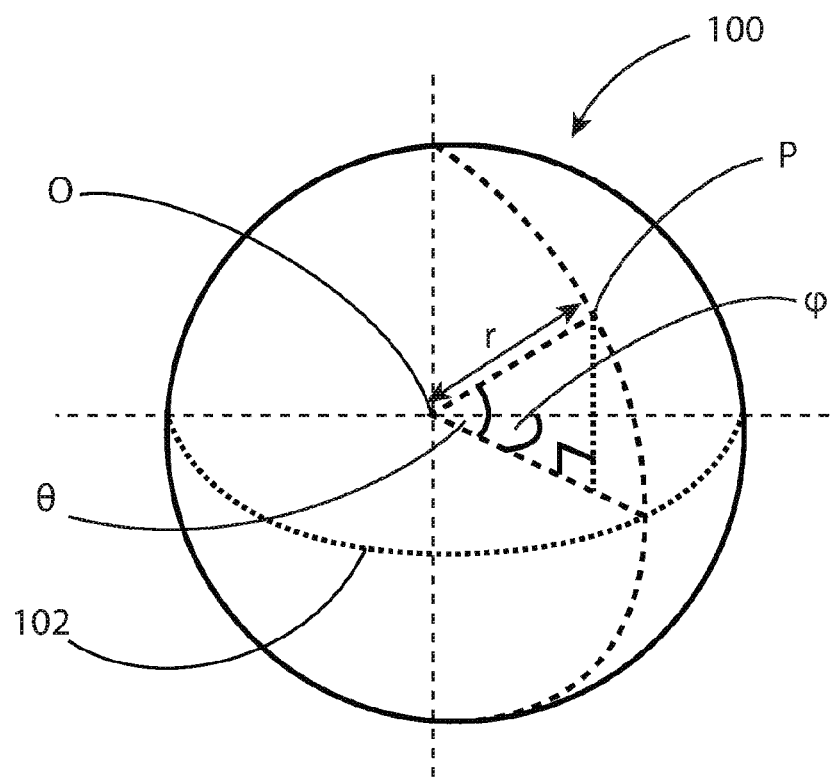
FIG. 1 illustrates the 3D spherical coordinate system for representing 360-degree spherical image data.
Figure 2:
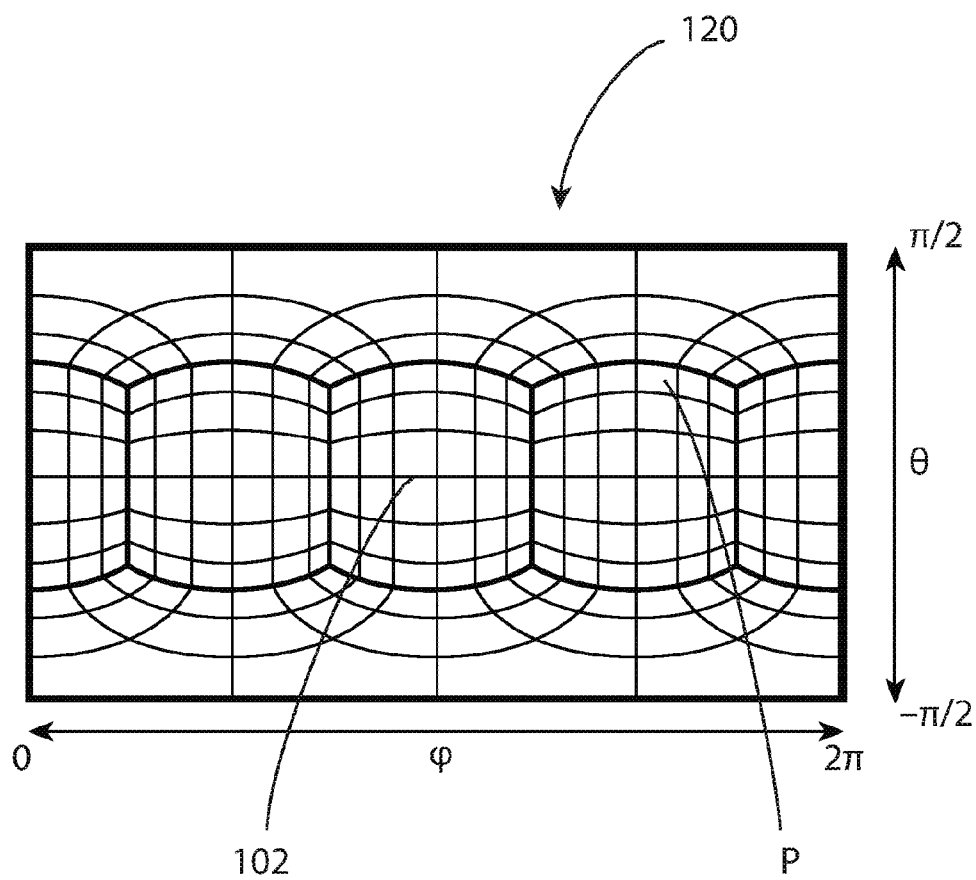
FIG. 2 shows an equirectangular projection of the data represented in FIG. 1.
Figure 3:
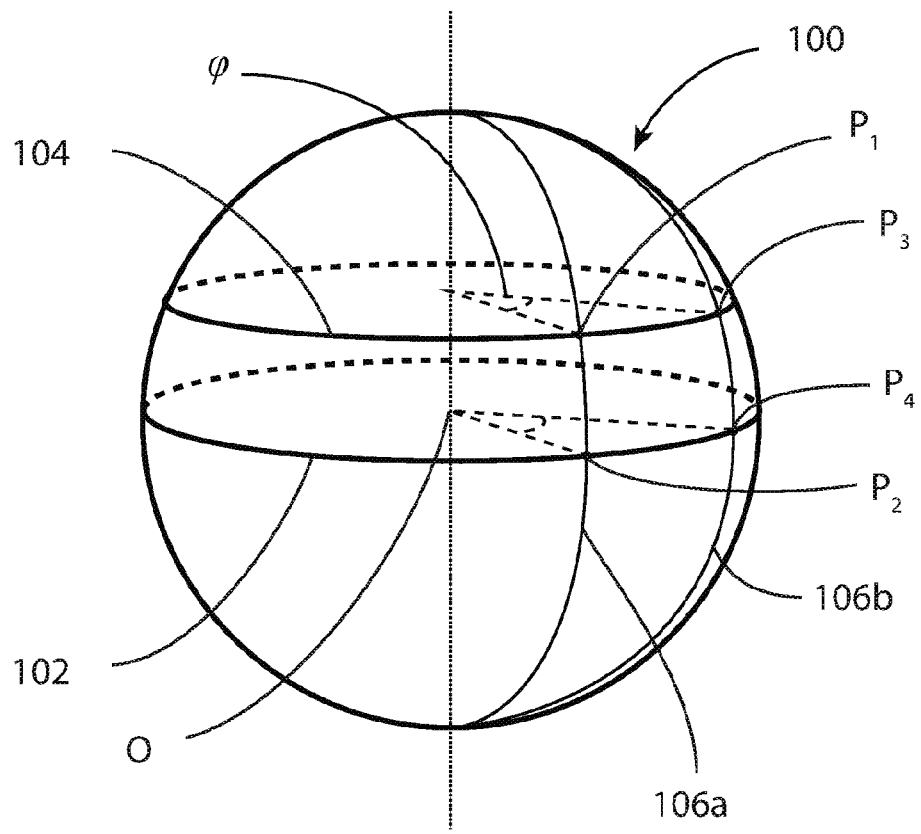
FIG. 3 illustrates the relationship between traversing fixed azimuthal angles at different polar angles in the spherical space of FIG. 1.
Figure 4:
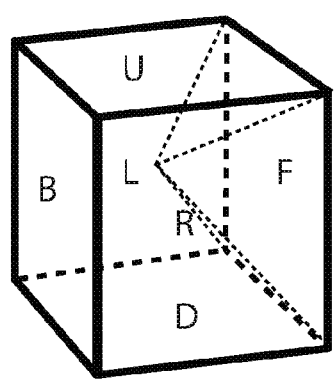
FIG. 4 illustrates the cubemap projection and its relationship to 3D image data.
Figure 5:
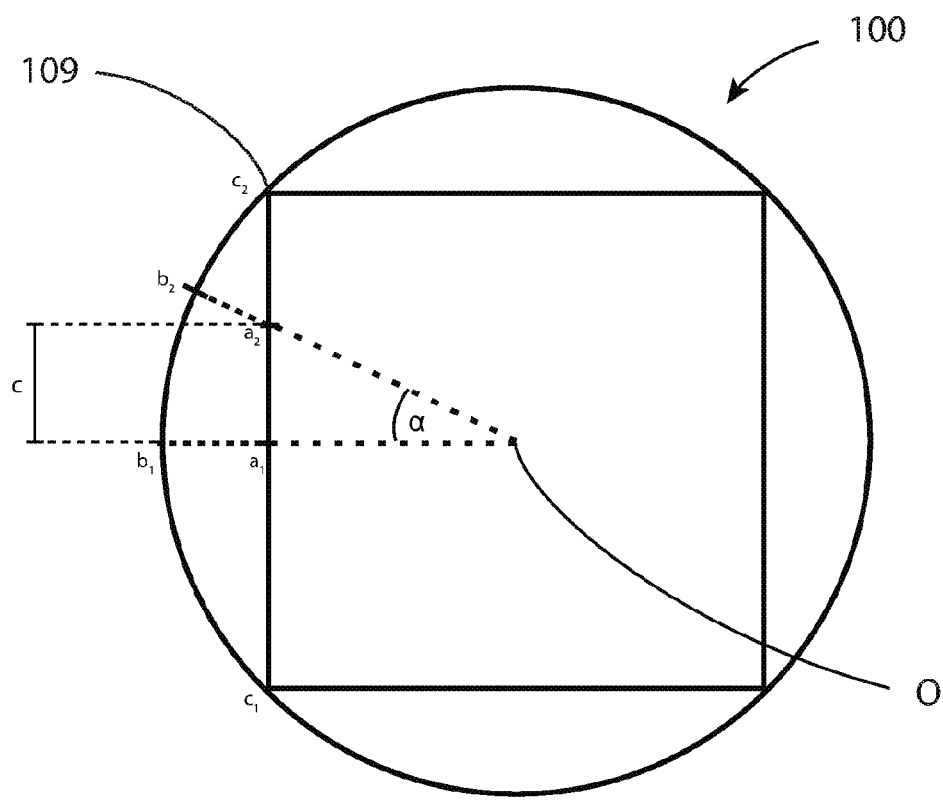
FIG. 5 illustrates distortions in the cubemap representation.
Figure 6:
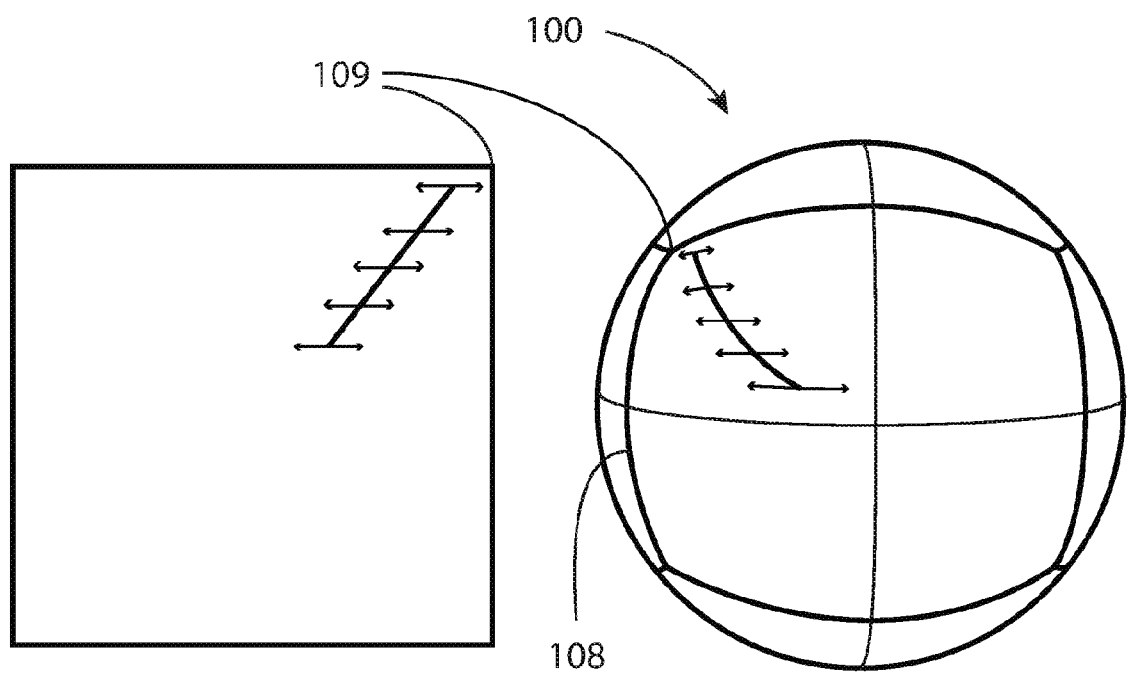
FIG. 6 illustrates further distortion effects in the cubemap representation.
Figure 7:
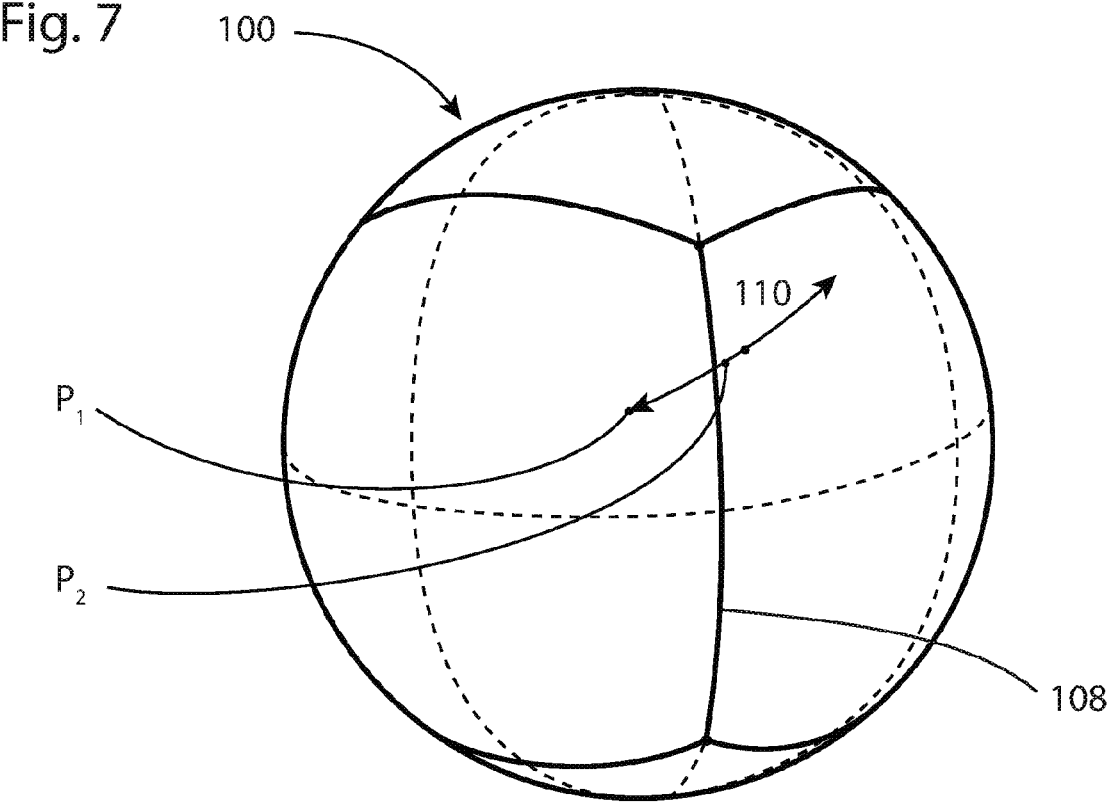
FIG. 7 illustrates issues caused by traversing between adjacent faces in the cubemap projection.

As noted in the discussion of FIG. 3, the "East/West" direction (changing φ only) is not appropriate for motions which are supposed to be orthogonal to the "North/South" direction (lines of constant longitude 106a, 106b), except in the special case of movement exactly at the equator 102. In general, the correct approach is to take two great circles (which is why the equator 102 works, being a great circle). This is because in curved space, such as the surface of a sphere 100, the notion of a straight line generalises to a geodesic. In spherical space the geodesics are any great circle—the largest circle that can be made on the surface of the sphere 100, having a radius equal to the radius of the sphere 100. The natural extension of this is that processes requiring two orthogonal straight lines in flat 2D space correspond to two great circles intersecting at 90 degrees at a particular point on the sphere 100. Note that familiar directions North, South, East, West are used as a convenient shorthand. It is not necessary that either great circle aligns with one of these directions, so long as they meet orthogonally at the point of interest. In some cases, it can simplify the calculations to align one of the great circles with the North/South direction, however.

Note that this method is equivalent to rotating the sphere 100 relative to the coordinate system until the source pixel is on the equator 102 (θ=0 line), then using familiar notions of north and south, east and west (along the new equator) to identify two orthogonal great circles of the north-south line through the source pixel and the new equator (the new equator necessarily has the source pixel on it by virtue of the coordinate change). The main change in doing this is that the new equator no longer intuitively represents a horizontal view. While this alternative process results in a simplified identification of orthogonal great circles, and corresponding simplification of pixels in the 2D flat representation, it soon becomes unwieldy to change the coordinate system in this manner for multiple pixels of interest and convert the results back into a useful format to align multiple pixels with one another, meaning that the saving in computational complexity in determining which pixels to sample is outweighed by the process of repeatedly shifting the coordinate system for each pixel of interest.

Figure 8:
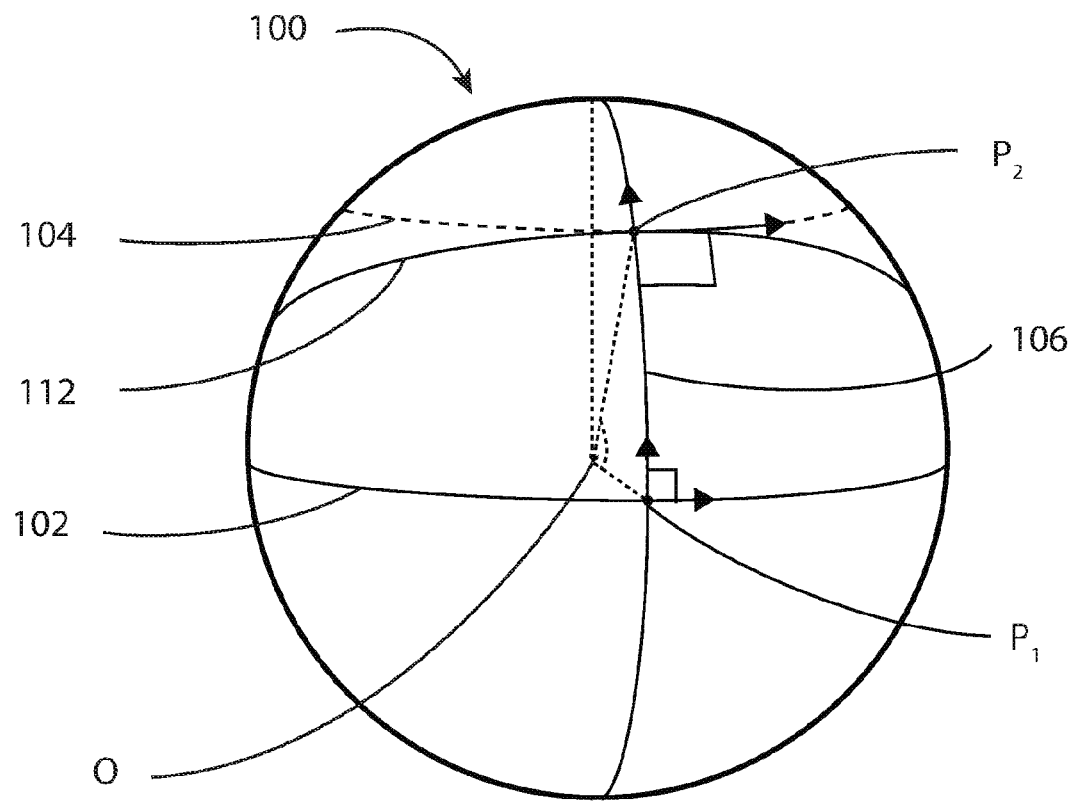
FIG. 8 shows the implementation of two orthogonal great circles in the spherical space of FIG. 1.

FIG. 8 provides an illustration of the process of finding a pair of orthogonal great circles 106, 112. Here, the incorrect "East/West" direction from point P$_2$ (the source pixel) is shown as a dashed line 104 (running from point P$_2$, to the edge of the sphere, and continuing around the rear surface of the sphere), while the correct path is shown as a solid line 112 extending from point P$_2$ to the edge of the sphere (and indeed continuing around the rear of the view). While both the "incorrect" line 104 and the great circle 112 intersect the "North/South" line 106 (running between P$_1$ on the equator 102 and P$_2$ spaced away from the equator 102 and on to the North Pole) at 90 degrees at point P$_2$, the further from P$_2$ these lines 104, 112 extend the more apparent becomes their divergence from one another.

In order to map out an area which is a constant distance from point P$_2$, at orthogonal directions from P$_2$, great circles must be followed (e.g. lines 106, 112). If, for example, a graphical processing effect is to be applied in an area with point P$_2$ at the centre, the distances from point P$_2$ to the edge of the area of effect must be made along great circle lines. If instead the line 104 is followed, the resulting effect will be that the incorrect area is used and any effect which is applied in that area appears distorted.

This is important because graphical processing makes use, where possible, of separable 2D processing kernels, which can be broken down into two 1D kernels for operating sequentially on input image data to give the same effect as the 2D kernel would. For a 3×3 kernel, instead of performing a calculation on all nine pixels, a horizontal and a vertical pass are performed sequentially leading to 2×3=6 pixel samples. In other words, the processing steps required for a 2D kernel grows as O(n$^2$), while separating and performing sequential operations grows only as O(n), where n is a characteristic dimension of the kernel. For large kernels, this represents a significant saving in computational power.

Once an orthogonal pair of great circles 106, 112 has been selected, the points at which a processing kernel should operate can easily be extracted using points on those great circles 106, 112 as axes. Where the kernel is separable, the great circles 106, 112 act to provide a set of points at which the individual 1D kernels should each operate (sequentially) to provide the same effect as the 2D kernel operating over the desired area.

Having identified the correct points to consider as part of the operation, it is possible to operate on the image data in a variety of representations. Typically graphical processing pipelines do not store image data as points on a sphere as it is hard to consistently map this to 2D arrays of pixels. Instead, images are stored in flat (distorted, as discussed at length above) 2D arrays of pixels. In particular, the equirectangular and cubemap representations are commonly used as they are convenient and well-understood representations of the image data in flat 2D space. Using the lines and/or areas identified by the great circle method described with reference to FIG. 8, it becomes possible to apply 2D kernels and pairs of separated 1D kernels to these flat 2D representations in largely the normal manner, save for at least one of the lines along which the axes of the kernels extend not being a straight line in the flat 2D representation.

A commonly used blur matrix, for example, is the Gaussian blur matrix which is well-recognised as providing a smooth and natural looking blur by sampling nearby pixels with a weighting that tapers away with distance following (as closely as possible in the discretised space of pixels) the Gaussian function (or bell curve). The Gaussian blur kernel may be approximated as the following:

$$\frac{1}{256}\begin{bmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{bmatrix}$$

where the factor of 1/256 is provided to prevent the operation from adding brightness to the process. This kernel specifies sampling weights for a source pixel (located at position 3,3 and having a value of 36/256), and for pixels out to a blur radius of 2 pixels away in all directions.

Figure 9:
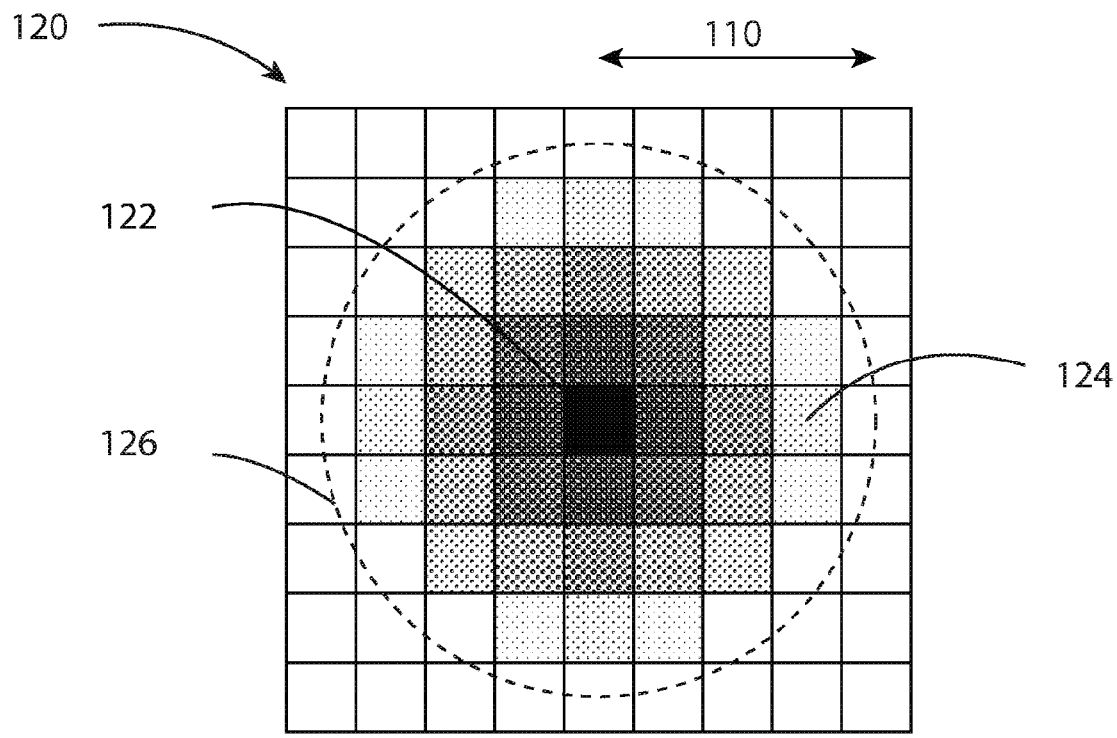
FIG. 9 represents the implementation of a sampling kernel.

A visual example of the intensity of a similar kernel is shown in FIG. 9. Here a 2D array of pixels 120 includes a source pixel 122 and a plurality of other pixels 124 around the source pixel 122. Sampling weights are provided out to a blur radius 110 of three further pixels, and are illustrated visually such that darker and fuller shading represents larger sampling weights. The pixels which would be sampled starting from the source pixel 122 are those within the dashed line 126. Outside of the circle 126 no pixels can affect the weighted average which is performed if the blur kernel is applied to the source pixel 122.

The operation works by locating the centre of the kernel over a source pixel 122. Each of the other entries in the kernel overlies a pixel near the source pixel 122. Considering the 2D array above, for example, this means that pixels directly adjacent to the source pixel 122 in the up, down, left and right directions would be overlaid by the four entries of 24, and so forth. The values of the pixels overlapped by the kernel are multiplied by the value of the kernel entry overlying them and added to a running total, for example a pixel having an RGB value of (64, 128, 256) overlaid by a kernel entry of 6 would add (6/4, 3, 6) to the running total. Once all the sums have been made, the final pixel value is arrived at. By processing each pixel of an input image in this way (using the unaltered input image each time), the complete image can be blurred. Note that the Gaussian blur kernel is separable (due to the mathematical properties of the Gaussian function) into two orthogonal kernels:

$$\frac{1}{16}\begin{bmatrix} 1 \\ 4 \\ 6 \\ 4 \\ 1 \end{bmatrix} * \frac{1}{16}[1 \ 4 \ 6 \ 4 \ 1]$$

Meaning that the exact same blur effect can be achieved by operating on the same pixels using sequential passes of the two separated 1D kernels. By selecting the above weightings and applying along lines corresponding to great circles meeting orthogonally at a point, a Gaussian blur can be implemented in distorted representations by selecting appropriate pixels in the 2D space. The process can be applied to as many source pixels as desired (including to all pixels in an input image), and to as many input images as needed (e.g. to frames in a video stream).

Note that the size of the kernel can be selected to determine the number of pixels in any direction which will be incorporated into a blur. The size of the kernel therefore represents the number of coordinate pairs which need to be determined along a great circle so that a pixel can be found corresponding to each coordinate pair, and further to which an entry in the kernel applies (for applying a weighting to a pixel sample, for example). In some cases, the kernels may have different numbers of entries for each of four directions away from the source pixel, in other cases, such as that described above, the kernels may be symmetric in number about the source pixel, but it will be apparent that different kernels can be constructed in which the source pixel is not at the centre of the kernel and indeed in which the kernel is not even square. However, in what follows for simplicity square kernels with the source pixel at the centre will be discussed in detail with the understanding that the methods apply equally to situations where this is not the case.

A square blur array with the source pixel at the centre can be formed in the following manner:
1. Create a one-dimensional array of Gaussian weights where the first item in the array is the weighting of the source pixel and the last item in the array is the weighting of the furthest sample from the source pixel.
2. The length of this array may vary depending on user preference as may the implementation of the normal distribution (e.g. standard deviation, etc.).
3. The length of the array is an odd number in this case so that the additional samples fan out symmetrically on either side (and also in orthogonal directions) of the source pixel which is assigned the first weight in the array.
4. In order to avoid adding brightness to the image, the array must be normalised by scaling every element in the array by the same factor ($\alpha$) to make the following true (where n is the total number of elements in the array indexed by i, and $w_i$ is the weight of the $i^{th}$ sample):

$$\alpha\left(i_0 + 2\sum_{i=1}^{n} w_i\right) = 1$$

In other words, $\alpha$ is selected so that the above is true. $i_0$ above represents the weighting factor for the source pixel.

Typically, the points at which pixels are to be sampled are spaced evenly along the great circles, so that each adjacent pair of sampling locations is equally far from adjacent sampling points, although this is not necessary and uneven spacing may be used in some contexts. In cases where the sampling points are evenly spaced, the great circles are traversed a series of successive distances equal to the total blur radius divided by the total number of samples (i.e. size of the blur kernel in number of entries from the source pixel). So for the above 5×5 array, there are two entries between the source pixel at the centre and the edge of the array, so each step moves along the great circle a distance equal to half the blur distance. In two steps, the final sample is taken at the outer extent of the blur distance.

However many samples are to be taken, it is necessary to determine the spherical polar coordinates at which that sample is to be taken. This can be obtained by using the reverse haversine formula, which takes as an input the bearing, $\lambda$, at an initial point $(\theta_a, \varphi_a)$ and a distance travelled, d, (i.e. in the above example half the blur distance or the full blur distance), and outputs the spherical polar coordinates of the destination point which is arrived at after a distance d has been travelled around the great circle. The formulae for $\theta_b$, and $\varphi_b$ on a unit sphere (as is assumed here) are:

$\theta_b = \sin^{-1}(\sin(\theta_a)\cdot\cos(d) + \cos(\theta_a)\cdot\sin(d)\cdot\cos(\lambda))$ and $\varphi_b = \varphi_a + \text{atan } 2(\sin(\lambda)\cdot\sin(d)\cdot\cos(\theta_a), \cos(d) - \sin(\theta_a)\cdot\sin(\theta_b))$ in which atan2(y,x) is defined as the inverse tangent function $\tan^{-1}(y/x)$, in which the sign of both x and y (and not just whether they have the same or different sign) is used to allow a distinction between diametrically opposed angles to be output. Bearing is defined in the usual manner—a clockwise angle on the surface of the sphere (when viewed from the outside) measured around the initial point $(\theta_a, \varphi_a)$ to the destination point $(\theta_b, \varphi_b)$. This is illustrated in FIG. 10.

Figure 10:
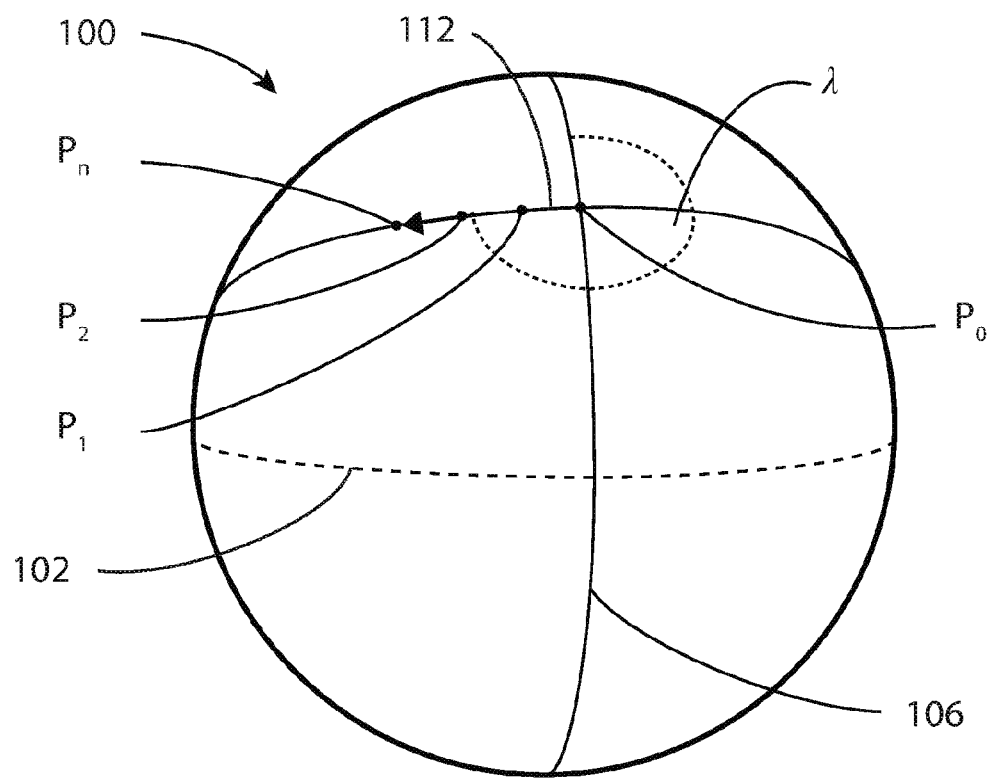
FIG. 10 illustrates the definition of bearing and distance in extracting coordinate locations in the spherical space.

In FIG. 10 a series of points $P_1, P_2, \ldots P_n$ are shown spaced along the great circle 112 extending approximately horizontally from the source pixel $P_0$. Each of these points $P_1, P_2 \ldots P_n$ represents a location having coordinates $(\theta_1, \varphi_1), (\theta_2, \varphi_2) \ldots (\theta_n, \varphi_n)$ at which a sample is to be taken. Having calculated the coordinates (using the haversine formula in conjunction with a selected value of d in each case to specify the spacing of each sampling location around the great circle), the corresponding pixels in the 2D representation can be located and sampled, applying the two 1D blur kernels.

Once these coordinates are extracted for every location on the sphere for which a sample is desired, pixels are sought in a flat 2D representation (e.g. an equirectangular representation) which correspond most closely to that coordinate. Once such a pixel is found, it is sampled, multiplied by the corresponding weighting from the blur kernel, and added to the running total of samples in the manner described above. At some point in this process, the source pixel is sampled by noting the pixel weighting at the corresponding entry in the blur kernel and multiplying the source pixel by this value and adding the result to the running total.

In a little more detail, each point on the surface is associated with a variety of parameters, which contribute to the process as follows:

| Point | Universal location | Distance from $(\theta_0, \varphi_0)$ | Weighting value | Input array pixel value (RGB) |
|---|---|---|---|---|
| $P_1$ | $(\theta_1, \varphi_1)$ | $d_1$ | $w_1$ | $(R_1, G_1, B_1)$ |
| $P_2$ | $(\theta_2, \varphi_2)$ | $d_2$ | $w_2$ | $(R_2, G_2, B_2)$ |
| ... | ... | ... | ... | ... |
| $P_n$ | $(\theta_n, \varphi_n)$ | $d_n$ | $w_n$ | $(R_n, G_n, B_n)$ |

The "universal location" is used to uniquely identify the point in any representation, by using the spherical coordinates of the point. The distance from the source pixel records the perceived distance between two points (e.g. around the great circle). The weighting value specifies how much of an effect a sample taken at that point has on the final weighted average when a blur effect is implemented. The input array pixel value records the value of the pixel (or value of the bilinear sampling of multiple pixels) sampled at the universal location in the input array. These parameters allow the weighted sum of any blur array to be calculated as follows for a given pixel:

$$(R, G, B)_{out} = w_0 \cdot (R_0, G_0, B_0) + \sum_{i=1}^{n} w_i \cdot (R_i, G_i, B_i)$$

in which the "0" subscript refers to the source pixel, and the sum runs over all pixels specified in the blur array. The RGB values are summed as a vector, so the output R is the weighted sum of the input sampled R values, and equivalently for the G and B output values.

Figure 11A:
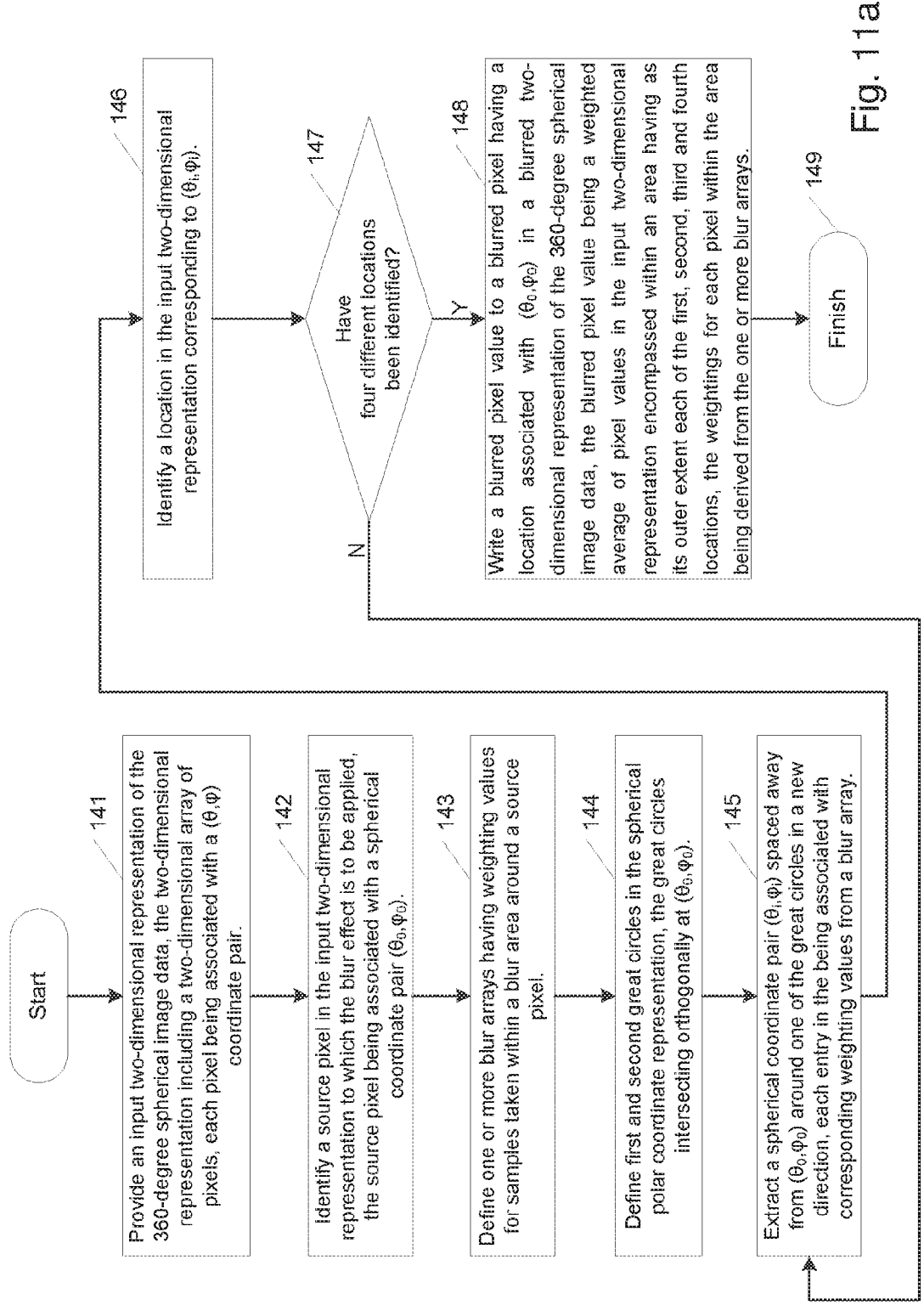
FIG. 11a is a flow chart illustrating a method of implementing a blur process in accordance with the present disclosure.

The overall sampling process is set out in the flow chart of FIG. 11a. The process begins at step 141 by providing an input two-dimensional representation of the 360-degree spherical image data, the two-dimensional representation including a two-dimensional array of pixels, each pixel being associated with a $(\theta,\varphi)$ coordinate pair.

A pixel is identified in step 142 from the input two-dimensional representation to which the blur effect is to be applied, the source pixel being associated with a spherical coordinate pair $(\theta_0,\varphi_0)$.

In step 143 one or more blur arrays are defined as described above, to provide sample weightings for pixels in a blur area around the source pixel. In some cases only a single blur array may be used in providing the weightings for the pixels to be sampled within the area. In such cases, the blur array may be two-dimensional, in essence providing individual weightings for each pixel within the area, or for each pixel to be sampled in the area. This allows freedom in preparing an array containing any values, although may come at a computational cost in terms of efficiency. Note that for situations in which isolated pixels are to be processed, this inefficiency is inevitable in the sense that a full 2D array is the only way to apply blur to a single pixel (indeed the notion of blur applied to a single pixel arguably breaks down). Where blocks of contiguous pixels are to be blurred, greater efficiency may be achieved as explained in detail below with regard to FIGS. 11b to 11e.

Step 144 involves defining first and second great circles in the spherical polar coordinate representation, the great circles intersecting orthogonally at $(\theta_0,\varphi_0)$. By using two great circles which intersect orthogonally at the source pixel to determine the pixels to operate on, distance and direction are correctly determined. This in turn ensures that the pixels which are sampled to form the weighted average leading to the blurred output pixel are located within an area which truly represents the intended area around the source pixel in terms of distance in particular directions.

In step 145, a spherical coordinate pair $(\theta_i,\varphi_i)$ is extracted, which is spaced away from $(\theta_0,\varphi_0)$ around one of the great circles a distance $d_i$ in a new direction.

In step 146, a first location is identified in the input two-dimensional representation corresponding to $(\theta_i,\varphi_i)$.

At step 147, the process checks whether four different locations have been identified yet, and if not the process returns to step 145 to repeat steps 145 and 146 until four locations have been sampled.

If four different locations have been identified in step 147, then the method proceeds to step 148 in which a blurred pixel value is written to a blurred pixel having a location associated with $(\theta_0,\varphi_0)$ in a blurred two-dimensional representation of the 360-degree spherical image data, the blurred pixel value being a weighted average of pixel values in the input two-dimensional representation encompassed within an area having as its outer extent each of the first, second, third and fourth locations, the weightings for each pixel within the area being derived from the one or more blur arrays. This then proceeds to the finish step 149, indicating that the source pixel has been blurred. Of course, the method can be repeated many times to provide multiple blurred pixels in the blurred two-dimensional representation.

The area over which the effect is applied can be determined in many ways. For example, a simple square, diamond or rectangle can be drawn by joining the four locations as corners or side centres. A circle or ellipse or other curved boundary can be fit to the points in other cases. While it will be appreciated that these methods are somewhat crude, the overall method of correctly identifying edge points by taking account of the distortion can provide a suitable blur effect, particularly where the blur weightings drop off as a function of distance, thus allowing a 2D blur array to be correctly applied to the area around any source pixel.

More accurate methods involve forming a grid of sampling points by drawing a series of lines parallel to the paths traced out by the great circles. Finally, for single pixel implementations of the method such as that described above, it may be possible to form an arbitrarily closely spaced grid by calculating a series of great circles, evenly spaced apart near the source pixel, by stepping along the first great circle in increments of the desired distance and at each increment drawing a great circle perpendicularly to the first great circle. By repeating the process, but stepping along the second great circle and finding a series of locally perpendicular great circles a grid can be formed of arbitrary density for identifying sampling locations in the 2D input representation. As noted above, the correct notion of distance and direction leads to blur being implemented by sampling pixels in the correct area around a given source pixel.

Once one (or more than one) blurred pixel has been generated, the blurred pixel(s) may be merged back into the original input image the method may further comprise the step of: (3) merging the value of each pixel in the blurred two-dimensional representation into a corresponding pixel in the input two-dimensional representation. This allows the blur effect to be applied to the input 2D representation in cases where the blurred 2D representation does not include blurring effects applied to every pixel in the input image data. In cases where every pixel has had the blur effect applied to it, there may be no need to apply the merging step (3). This can be viewed as equivalent to a merging step where the relative weightings for the blurred 2D representation and the input 2D representation are 1 and 0 respectively.

Figure 11B:
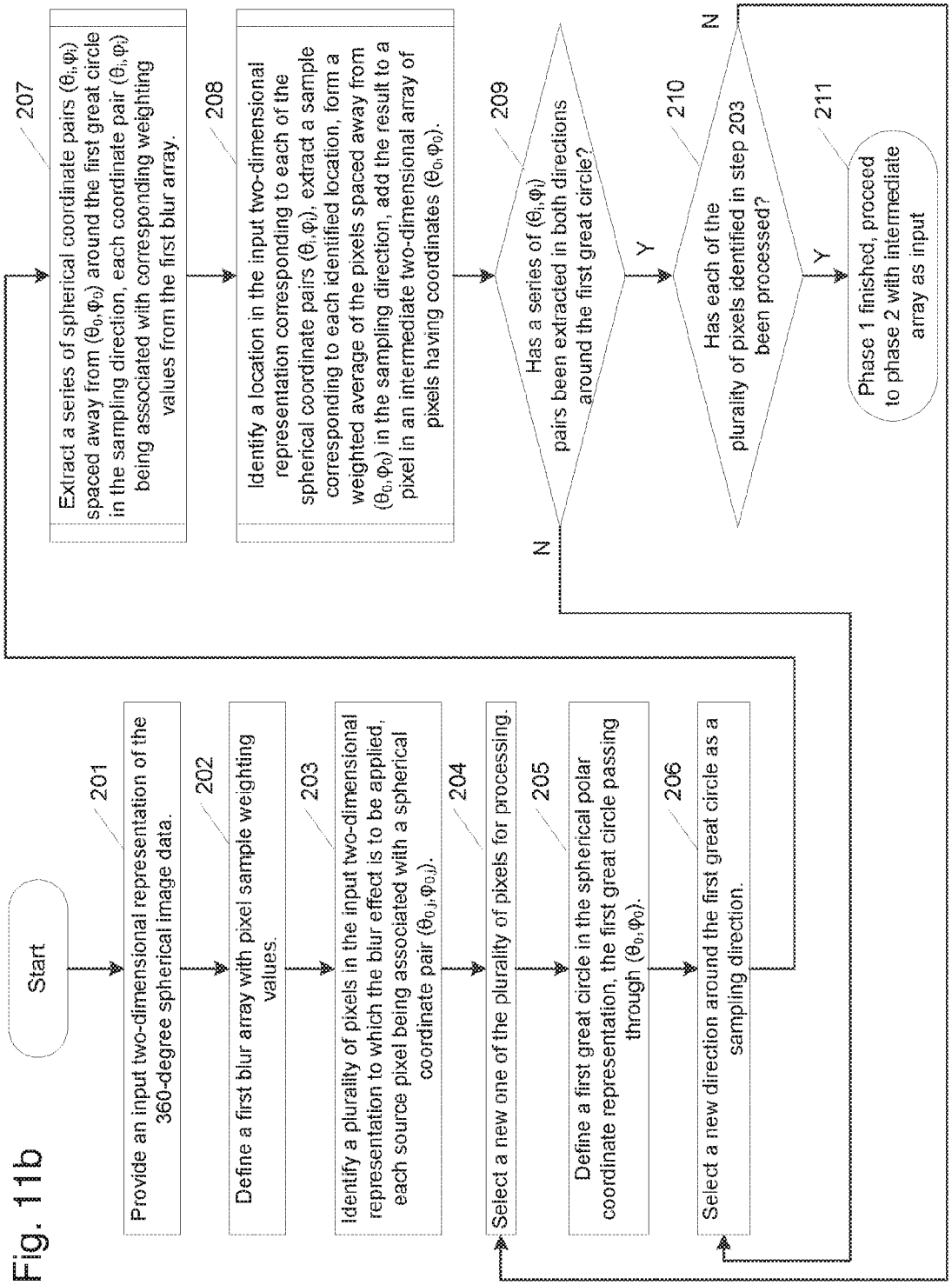
FIG. 11b is a flow chart illustrating a first blur pass using a first 1D blur array.
Figure 11C:
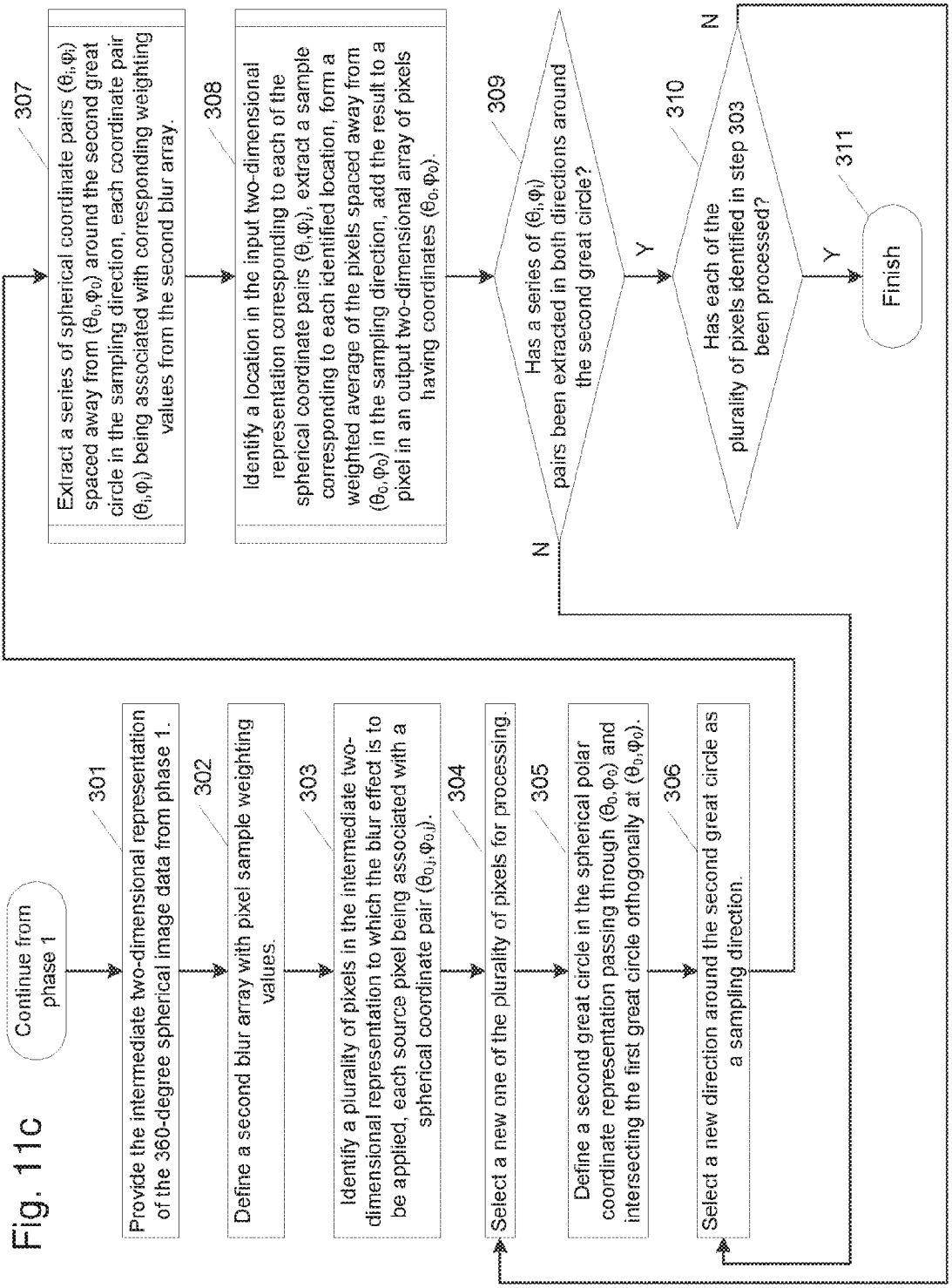
FIG. 11c is a flow chart illustrating a second pass using a second 1D blur array, orthogonal to the first array of FIG. 11b.

In FIGS. 11b and 11c, a further example of a method as disclosed herein is presented. Starting with FIG. 11b, a first step 201 begins with a 2D representation of 360-degree image data being provided. In line with the general disclosure herein, the 2D representations of FIGS. 11a to 11e include a two-dimensional array of pixels, each pixel being associated with a $(\theta,\varphi)$ coordinate pair, where $\theta$ is a polar angle and $\varphi$ is an azimuthal angle in a spherical polar coordinate representation of the 360-degree spherical image data.

In step 202 a first blur array is defined, having pixel sample values for weighting sampled pixels in the input 2D representation.

In step 203, a plurality of pixels are identified in the input two-dimensional representation to which the blur effect is to be applied, each source pixel being associated with a spherical coordinate pair $(\theta_{0,j},\varphi_{0,j})$.

As noted above, the blur effect may be applied to a subset of the input pixels, i.e. more than one pixel, but not all of the pixels. In other cases, the effect may be applied to the entire input image. Many of the advantages set out herein relating to processing the whole of the input pixel array may also apply to the processing of multiple (but not all) pixels, if the multiple pixels are located in a contiguous area. In order to make use of the advantages in efficiency, rather than selecting just the area of interest (the area to be blurred), an extended area including the area of interest and a border around the region is determined and the blur effect applied to the extended area. This means that pixels spaced away from the area of interest which would pick up some sampling do indeed pick up some sampling. Pixels outside the extended area are unaffected. By sweeping the blur arrays across the extended region as discussed herein, the desired visual information is processed correctly. This process works yet better with the filtering step discussed elsewhere herein in detail. Alternatively, the weighting values for pixels in the border region can be adjusted to prevent blur effects from pixels outside the region of interest manifesting.

As used in FIGS. 11b and 11c, the index "j" simply tracks the unique location of the source pixel which is currently being processed, and the index runs from 1 to the total number of pixels in the array (or at least to the total number of pixels being processed). Thus the first time step 204 is executed, the source pixel located at $(\theta_{0,1}, \varphi_{0,1})$ is processed, the second time step 204 is executed, the source pixel located at $(\theta_{0,2}, \varphi_{0,2})$ is processed and so on. The index "j" is dropped in subsequent steps, as each of steps 204 to 208 consider only a single source pixel at a time, so the label becomes redundant.

At step 204 a new one of the plurality of pixels is selected for processing. In other words, for each pixel to be processed, the subsequent steps are performed on that pixel (wherein that pixel is taken to have a location $(\theta_0, \varphi_0)$. Each pixel may be processed sequentially, or the process may make use of parallel processing to improve the performance and efficiency.

At step 205, a first great circle is defined in the spherical polar coordinate representation, the first great circle passing through $(\theta_0, \varphi_0)$. This great circle is unique to the current source pixel and subsequent executions of step 205 require a new great circle to be defined which passes through the (different) coordinates associated with the subsequent source pixel. The selection of which of the infinite great circles passing through $(\theta_0, \varphi_0)$ should be chosen is a free choice for the user. However, usually choices are made which simplify the calculations in subsequent steps. Great circles are uniquely defined by the (smallest) bearing with which they intersect the source pixel (i.e. smallest angle taken clockwise from North). While the user in theory has a free choice of which bearing to use to define the great circle passing through the source pixel on each iteration of step 205, the efficiency of the process set out in FIGS. 11b to 11e is maximised when the same bearing is used to define the first great circle for each pixel to be processed (e.g. each source pixel has as its first great circle a great circle running North-South through that source pixel). While we emphasise the freedom of choice of great circles, the North-South example will be used frequently in this example, and it will be seen that this choice is an example of a great circle choice which the mathematically simplifies the process.

In step 206, a new direction around the first great circle is selected as a sampling direction, for example a direction in which a series of samples will be taken. Since there are two possible directions around the first great circle from the source pixel, one direction is selected to take samples along. For example where the great circle intersects the source pixel with a bearing of 0° (great circle runs North-South), one direction is North, the other South. As each direction will be sampled in time (and the sampling operation is commutative) it does not matter which is chosen first.

In step 207, indicated here as including sub-processes (and described in more detail in FIG. 11d), a series of spherical coordinate pairs $(\theta_i, \varphi_i)$ spaced away from $(\theta_0, \varphi_0)$ (i.e. progressively further from the source pixel) are extracted, the series of pairs being spaced around the first great circle in the sampling direction, each coordinate pair $(\theta_i, \varphi_i)$ being associated with a corresponding weighting value from the first blur array. Note that while step 207 (as well as steps 208, 307 and 308) are indicated as including sub-process steps, other steps represented as single steps may also include sub-process steps. Similarly, it is not essential for any of steps 207, 208, 307, 308 to comprise sub-process steps, this is presented solely to clarify the processing steps which may occur.

The index "i" is used for tracking the distinct coordinate pairs in each series and runs from 1 to the total number of members of that series. So for example, the first series of spherical coordinate pairs $(\theta_{i,1}, \varphi_{i,1})$ has $n_1$ members, meaning i runs from 1 to $n_1$, the members being: $(\theta_{1,1}, \varphi_{1,1})$, $(\theta_{2,1}, \varphi_{2,1})$, ... $(\theta_{n1,1}, \varphi_{n1,1})$. When considering the second series of spherical coordinate pairs $(\theta_{i,2}, \varphi_{i,2})$ there are $n_2$ members, and i runs from 1 to $n_2$, the members being: $(\theta_{1,2}, \varphi_{1,2})$, $(\theta_{2,2}, \varphi_{2,2})$, ... $(\theta_{n2,2}, \varphi_{n2,2})$, and so forth. In other words, index "i" is used to step through successive members of a set, but may refer to different members (indeed different sets) on different executions of step 207.

In step 208, indicated here as including sub-processes (and described in more detail in FIG. 11e), a location is identified in the input two-dimensional representation corresponding to each of the spherical coordinate pairs $(\theta_i, \varphi_i)$, a sample corresponding to each identified location is extracted, a weighted average is formed of the pixels spaced away from $(\theta_0, \varphi_0)$ in the sampling direction, and the result added to a pixel in an intermediate two-dimensional array of pixels having coordinates $(\theta_0, \varphi_0)$. In other words, pixel samples are taken at locations identified by each of the coordinate pairs and added to a running total for recording in the pixel having a location associated with $(\theta_0, \varphi_0)$ in the intermediate pixel array. The result is a weighted average with weighting values being provided by the first blur array. When this process is executed subsequent times (e.g. for the second direction along the great circle), the values sampled are added to the running total (i.e. they do not overwrite the value and start adding from 0). It can be seen that the use of the great circle allows a definition of a sampling direction on the surface of the sphere, which in turn leads to a line (almost always non-straight) in the 2D representation of the image data along which samples are taken.

At step 209, the process checks whether both directions around the first great circle have had coordinate pairs extracted around them. If not, the process returns to step 206 to repeat steps 206 to 209 in a new direction. If both directions have been sampled, the process proceeds to step 210.

Step 210 checks that each of the plurality of pixels identified in step 203 have been processed. In other words has a pixel been written to the intermediate array in a location corresponding to every pixel to be processed? If no, the process returns to step 204 and repeats steps 204 to 210 until every pixel to be processed has been processed.

If the answer to the question in step 210 is yes, the process proceeds to step 211, in which the intermediate 2D pixel array is finished. Phase 2 of the blur procedure can now begin, as detailed in FIG. 11c.

FIG. 11c is largely analogous to FIG. 11b and similar steps are labelled with similar numbers (step 201 is similar to step 301, and so on). Note that this does not imply any similarity with other reference numbers, e.g. steps 202 and 302 are not related to element 102. Given the similarities, in the following the differences and correlations between FIGS. 11b and 11c are emphasised rather than repeating the discussion in full. Broadly, the execution of the process in FIG. 11b defined a first orientation for sampling pixels and swept across the input array writing pixels in turn to the intermediate array which represent a blur of each source pixel in one dimension. FIG. 11c repeats this process but using an orientation rotated 90° to that used to blur in FIG. 11*b*. 90° (or orthogonal) here makes use of the modified definition in which two great circles in the spherical view are selected which intersect at the source pixel at 90°. As described in detail herein, this allows a correct implementation of a separable 2D kernel, by sweeping two 1D kernels across the pixels to be processed and thereby using fewer processing steps.

In step 301 a 2D array is provided, which is the intermediate array formed by the execution of the process set out in FIG. 11*b*.

In step 302 a second blur array is defined having pixel sample values for weighting sampled pixels in the intermediate 2D representation. In some examples, there may be only one blur array, which is applied first in one direction, then rotated to apply to the orthogonal direction. This can save on calculation complexity by reusing blur arrays, and also allows commonly used blur arrays to be used, and reused if needed.

In step 303, a plurality of pixels are identified in the intermediate two-dimensional representation to which the blur effect is to be applied, each source pixel being associated with a spherical coordinate pair $(\theta_{o,j}, \varphi_{o,j})$. The pixels identified in this step should at least include pixels having the same location as the pixels identified in step 203.

At step 304 a new one of the plurality of pixels is selected for processing. In other words, for each pixel to be processed, the subsequent steps are performed on that pixel (wherein that pixel is taken to have a location $(\theta_o, \varphi_o)$. Each pixel may be processed sequentially, or the process may make use of parallel processing to improve the performance and efficiency.

At step 305, a second great circle is defined in the spherical polar coordinate representation, the second great circle passing through $(\theta_o, \varphi_o)$. This great circle is unique to the current source pixel and subsequent executions of step 305 require a new great circle to be defined which passes through the (different) coordinates associated with the subsequent source pixel. The second great circle intersects the first great circle orthogonally at $(\theta_o, \varphi_o)$. This criterion means that the second great circle for each pixel is uniquely defined once the first great circle for that location has been defined. E.g. if the first great circle through $(\theta_0, \varphi_o)$ runs North-South through that source pixel, the second one intersects $(\theta_0, \varphi_o)$ on an East-West bearing (locally). This unique definition of a second great circle based on the definition of the first great circle means that in some cases the two great circles are defined at the same time, i.e. in step 205. Since repeated executions of step 205 sometimes make use of the same bearing each time (e.g. North-South for each source pixel), the second great circles will all intersect locally at the same bearing (e.g. East-West in this example).

In step 306, a new direction around the second great circle is selected as a sampling direction, for example a direction in which a series of samples will be taken. Since there are two possible directions around the second great circle from the source pixel, one direction is selected to take samples along. For example where the great circle intersects the source pixel with a bearing of 90° (great circle runs locally East-West), one direction is East, the other West. As each direction will be sampled in time (and the sampling operation is commutative) it does not matter which is chosen first.

In step 307, indicated here as including sub-processes (and described in more detail in FIG. 11*d*), a series of spherical coordinate pairs $(\theta_i, \varphi_i)$ spaced away from $(\theta_0, \varphi_o)$ (i.e. progressively further from the source pixel) are extracted, the series of pairs being spaced around the second great circle in the sampling direction, each coordinate pair $(\theta_i, \varphi_i)$ being associated with a corresponding weighting value from the second blur array.

In step 308, indicated here as including sub-processes (and described in more detail in FIG. 11*e*), a location is identified in the intermediate two-dimensional representation corresponding to each of the spherical coordinate pairs $(\theta_i, \varphi_i)$, a sample corresponding to each identified location is extracted, a weighted average is formed of the pixels spaced away from $(\theta_0, \varphi_o)$ in the sampling direction, and the result added to a pixel in an output two-dimensional array of pixels having coordinates $(\theta_0, \varphi_o)$. In other words, pixel samples are taken at locations identified by each of the coordinate pairs and added to a running total for recording in the pixel having a location associated with $(\theta_0, \varphi_o)$ in the output pixel array. The result is a weighted average with weighting values being provided by the second blur array. When this process is executed subsequent times (e.g. for the second direction along the second great circle), the values sampled are added to the running total (i.e. they do not overwrite the value and start adding from 0).

At step 309, the process checks whether both directions around the second great circle have had coordinate pairs extracted around them. If not, the process returns to step 306 to repeat steps 306 to 309 in a new direction. If both directions have been sampled, the process proceeds to step 310.

Step 310 checks that each of the plurality of pixels identified in step 303 have been processed. In other words has a pixel been written to the output array in a location corresponding to every pixel to be processed? If no, the process returns to step 304 and repeats steps 304 to 310 until every pixel to be processed has been processed.

If the answer to the question in step 310 is yes, the process proceeds to step 311, in which the output 2D pixel array is finished. This results in the full blur effect having been applied to the input array.

Where all pixels in the input array are processed in this way the process inherently remains synchronised because each time the method is run, the same number of calculations is performed, meaning that any parallel processing implemented starts and finished at the same time, and the process overall remains synchronised. This is especially important in processing video streams, in which a series of frames must be rapidly processed sequentially. De-synchronisation could lead to a failure of the system e.g. certain parts of certain frames may still be being processed while other parts of subsequent frames are being processed. Correcting this to re-synchronise the frames can be computationally demanding.

The first and second blur arrays act orthogonally in the spherical space by virtue of their association with, respectively, the first and second great circles, so behave like the correct interpretation of two orthogonal axes. This in turn means that they can be used to define the decomposition of a separable 2D kernel. The two arrays are 1D in the sense that they operate along a line (contrast with a 2D array which specifies operations to be performed on every pixel in an area). This means that the two 1D arrays can be applied to the source pixels one array at a time to provide an effect which is equivalent to a full 2D array, but with fewer processing steps. Note that the output 2D representation is not necessarily a final output, merely the result of applying the blur arrays to the input data. There may be further processing steps applied to the output pixel array to further change it.

Note that while the above description involves taking four sets of samples consecutively: in each of two opposed directions along each of the two great circles, this is not necessary. In some cases, the process of FIG. 11b may extract spherical coordinate pairs in step 207 located on opposed sides of the source pixel (around the first great circle) and sample both sides at once in step 208. This means that the answer to the question in step 209 will necessarily be "Yes", and this checking step can in fact be omitted. Similarly, the process in FIG. 11c may extract spherical coordinate pairs in step 307 located on opposed sides of the source pixel (around the second great circle) and sample both sides at once in step 308. This means that the answer to the question in step 309 will necessarily be "Yes", and this checking step can in fact be omitted In some cases, there may be some overlap in the values stored in the one or more blur arrays (or in portions of the same blur array), and in particular the first and second blur arrays may be identical. In this case, there may not actually be two distinct first and second blur arrays and a single array may be used for both operations. In fact, a single odd-numbered blur array may be defined and used repeatedly—e.g. twice, once oriented in a first orientation, and once oriented in a perpendicular orientation, or four times, once each for the positive and negative directions for the first orientation, once more for each of the positive and negative directions in the perpendicular orientation. In such cases, an entry representing a weighting for the source pixel, and each subsequent entry represents a weighting for progressively further out samples, irrespective of orientation and/or direction (that is, the same weightings are used for pixel samples taken in each direction/orientation). In such cases, the weighting for the source pixel may be selected to be lower than the desired overall output value to account for the fact that the source pixel is sampled multiple times.

Turning now to FIG. 11d, which illustrates steps 207 and 307 in detail, the process begins at 407a in which user input is received specifying a number, n, of coordinate pairs $(\theta_i,\varphi_i)$ to be extracted, their relative spacing and the total distance, d, around the great circle the samples are to span. These parameters relate he total extent of the blur in pixels to distance on the surface of the sphere. The great circle in question is the first or second, depending on whether this Figures represents a detailed view of step 207 or 307 respectively. The spacings of the sample locations around the great circle can even, or uneven.

At step 407b a new coordinate pair $(\theta_i,\varphi_i)$ is selected to be extracted. That is, the spherical coordinates of a new sampling location are to be determined. Here, "i" is an index specifying which coordinate pair is being considered (and corresponds to the index "i" in FIGS. 11b and 11c).

At step 407c, a distance $d_i$ is calculated, recording the distance of the selected coordinate pair $(\theta_i,\varphi_i)$ around the great circle as a fraction of the total distance based on the number and/or relative spacing of the coordinate pairs. That is, the distance can be phrased as a fraction of the total or as an absolute distance from the source pixel, from neighbouring sample locations, from the furthest sample location from the source pixel, and so on.

At step 407d the spherical coordinates $(\theta_i,\varphi_i)$ are extracted of a point spaced along the great circle a distance $d_i$ from $(\theta_0,\varphi_0)$ in the sampling direction and stored in memory. That is, the great circle is traversed a distance $d_1$ in the sampling direction and the coordinates at that location are noted and stored in memory. Direct extraction of the location, given a start point $(\theta_0,\varphi_0)$, a bearing (defined by the great circle), and a distance, $d_i$, is possible using the reverse haversine formula discussed above.

At step 407e a check is performed as to whether each coordinate pair has been extracted. If not, the process returns to 407b to repeat steps 407b to 407e until each coordinate pair has been extracted. once each coordinate pair has been extracted, the process proceeds to step 407f, in which the full set of coordinates are available, and the subroutine terminates. It is now possible to proceed to step 208, 308 or 408a, as the case may be, with a full set of coordinate pairs.

FIG. 11e represents steps 208 and 308 in more detail. The process begins at 408a in which one of the coordinate pairs $(\theta_i,\varphi_i)$ is selected. (e.g. as identified in step 207, 307, or 407d).

At step 408b a location in the 2D representation (either the input representation or the intermediate representation) associated with pairs $(\theta_i,\varphi_i)$ is identified, e.g. by searching for pixels located exactly at $(\theta_i,\varphi_i)$ pixels located closest to $(\theta_i,\varphi_i)$. This is important for identifying image data at that location.

At step 408c a value representative of the image data at $(\theta_i,\varphi_i)$ is extracted from the 2D representation. The value extracted may be an RGB vector or other format for recording image data. It may be sampled from the nearest pixel to pairs $(\theta_i,\varphi_i)$, or it may be a bilinear (or other) weighted average of nearby pixels.

At step 408d the extracted value is multiplied by a weighting factor from the blur array associated with the location.

At step 408e the result of the multiplication is added to a running total stored in a pixel in the output or intermediate 2D representation at a location associated with $(\theta_i,\varphi_i)$. The blue array is the first blur array if the result is being added to the intermediate 2D representation and is the second blur array if the result is added to the output 2D representation. This results in a weighted average of nearby pixels based on the weighting values in the blur array.

At step 408f the process checks whether samples have been taken at all coordinates pairs. If not, the process returns to step 408a to repeat steps 408a to 408f to take another sample at a new location. If the answer is yes, then the process proceeds to step 408g and completes the subroutine. the process can now proceed to step 209 or 309 as the case may be.

As noted above, bloom is a blur effect which occurs particularly to bright pixels. In order to apply blur to the correct pixels and not just blur every pixel in the image, the input image may undergo a filtering step prior to the blurring effect to categorise all pixels less bright than a particular threshold (chosen by a user to implement the effect in the desired manner) as null pixels, to be replaced with black, empty, or null pixels in the input image. Pixels having a brightness of at least this threshold value are copied in their initial form into the input image.

Figure 12A:
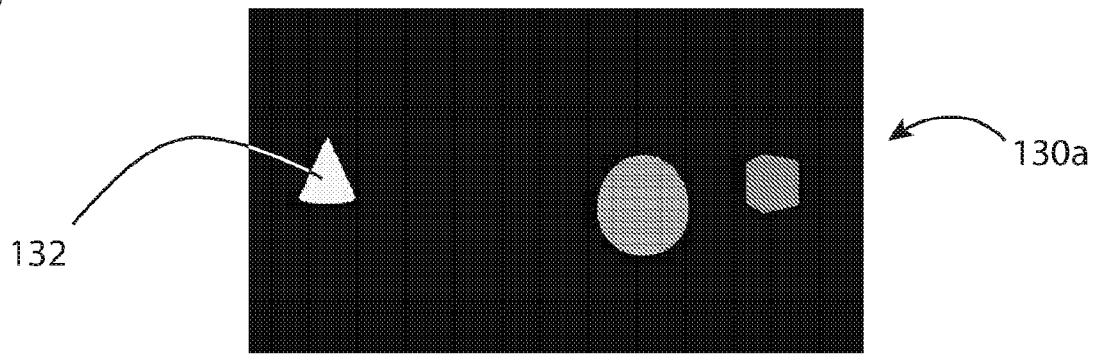
FIGS. 12a to 12c illustrate the effect of filtering input data based on a criterion and applying a blur effect to the filtered data.
Figure 12B:
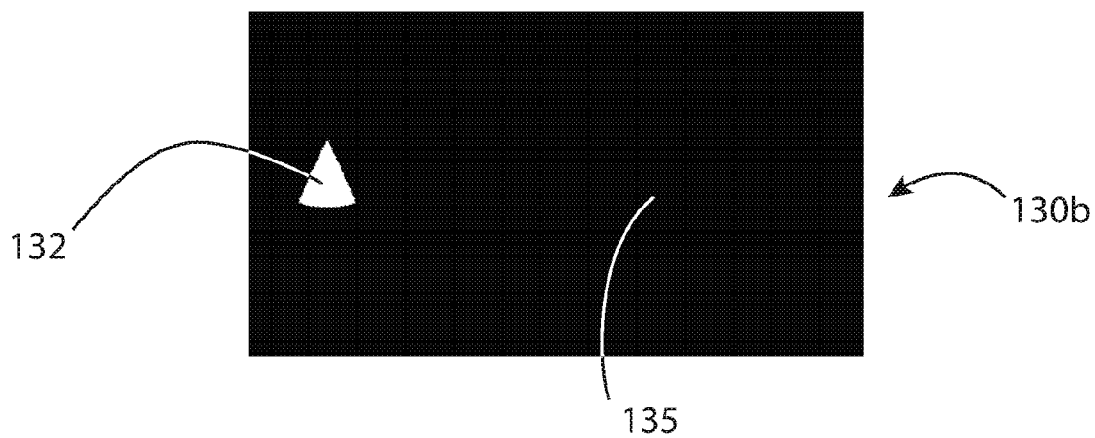
Figure 12C:
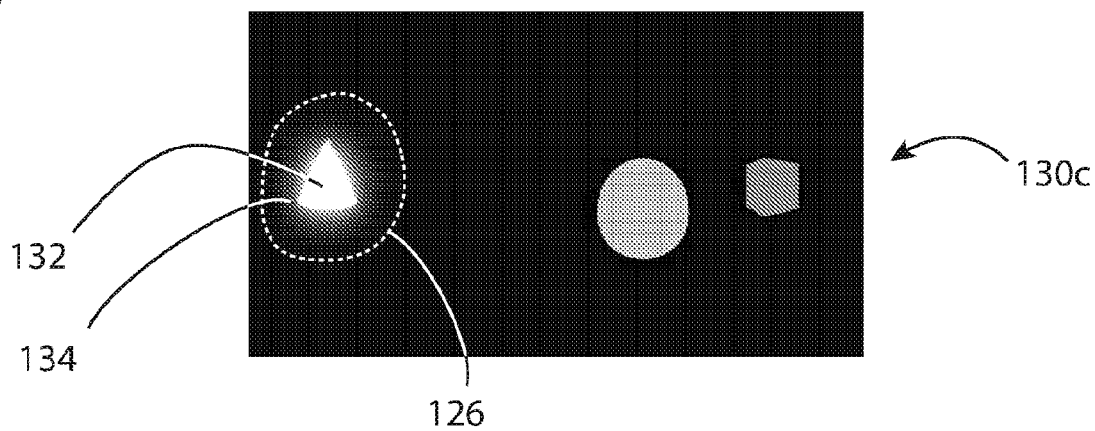

This process is shown in more detail in FIGS. 12a to 12c, in which FIG. 12a shows a virtual scene with bright regions, FIG. 12b shows the same scene after the filtering step has been implemented, and FIG. 12c shows the original scene with a bloom effect applied in accordance with the current disclosure.

In FIG. 12a, the two-dimensional array of pixels 130a is shown with a bright triangle 132, and a dimmer circle and square. The background is very dark or entirely black. In FIG. 12b, the scene 130a has been filtered resulting in a filtered image 130b. This has meant that the circle has been replaced with null pixels 135, as has the square and the whole background. Only the triangle 132 has retained its original form. The scene 130b in FIG. 12b is ready to have the blur process disclosed herein applied to it.

Once the blur process has been applied to the whole of image 130b, the result is blended back into the original image to result in the image 130c shown in FIG. 12c. Here it can be seen that, because most of image 120b had null pixels in it, no effect is visible in most of the image 120c because blending null pixels into a scene necessarily does not change the scene. A region 126 around the bright triangle 132, however, has had the effect implemented as intended. Pixels 134 close to the triangle 132 have been affected by the blurring process and now show the bloom effect due to their proximity to the triangle 132. Because these pixels 134 picked up some nonzero components in the blurring process, the process of blending them back into the original image 130a did result in a change.

Figure 13A:
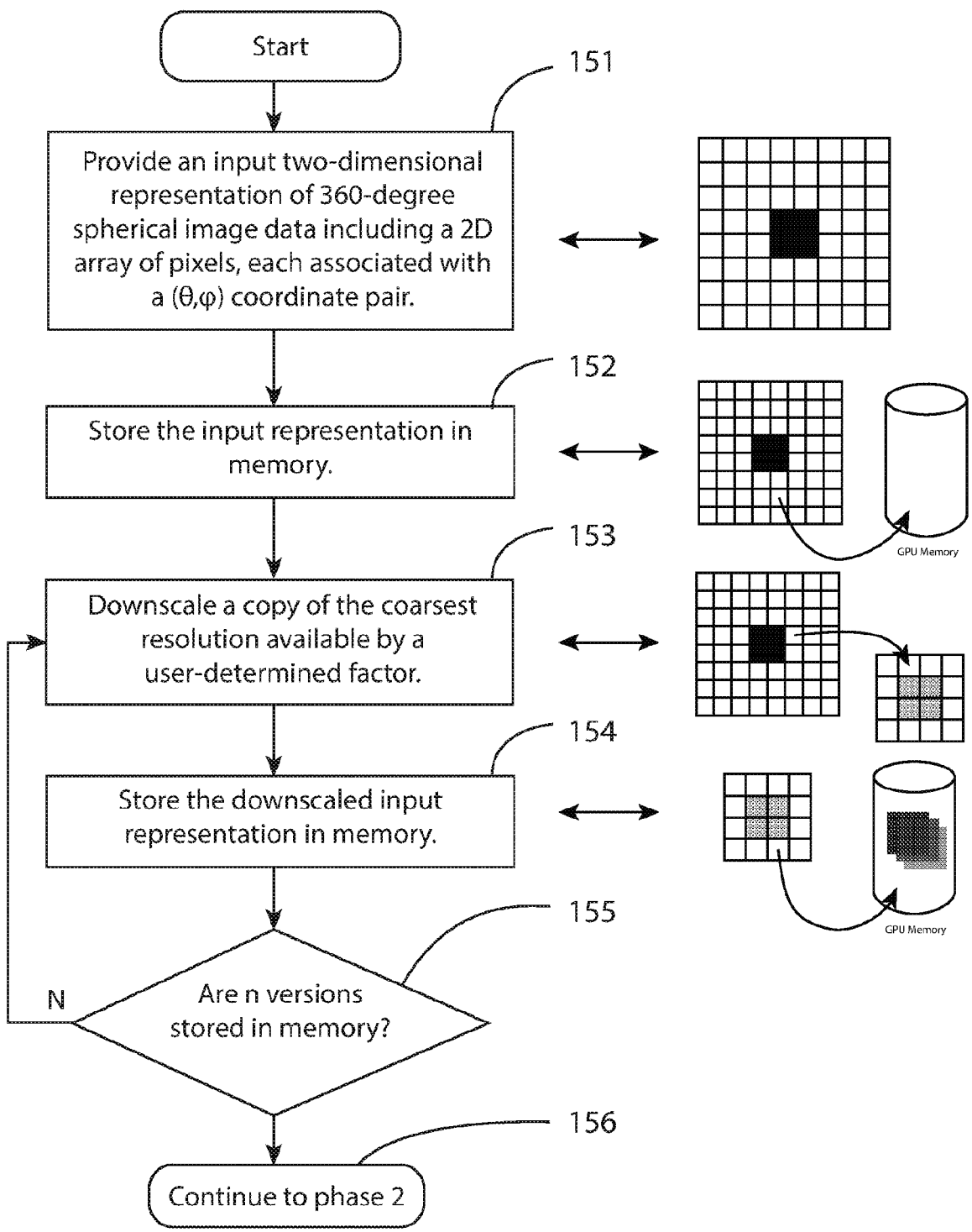
FIGS. 13a and 13b are flow charts illustrating a downsampling procedure for efficiently implementing a wide blur effect.
Figure 13B:
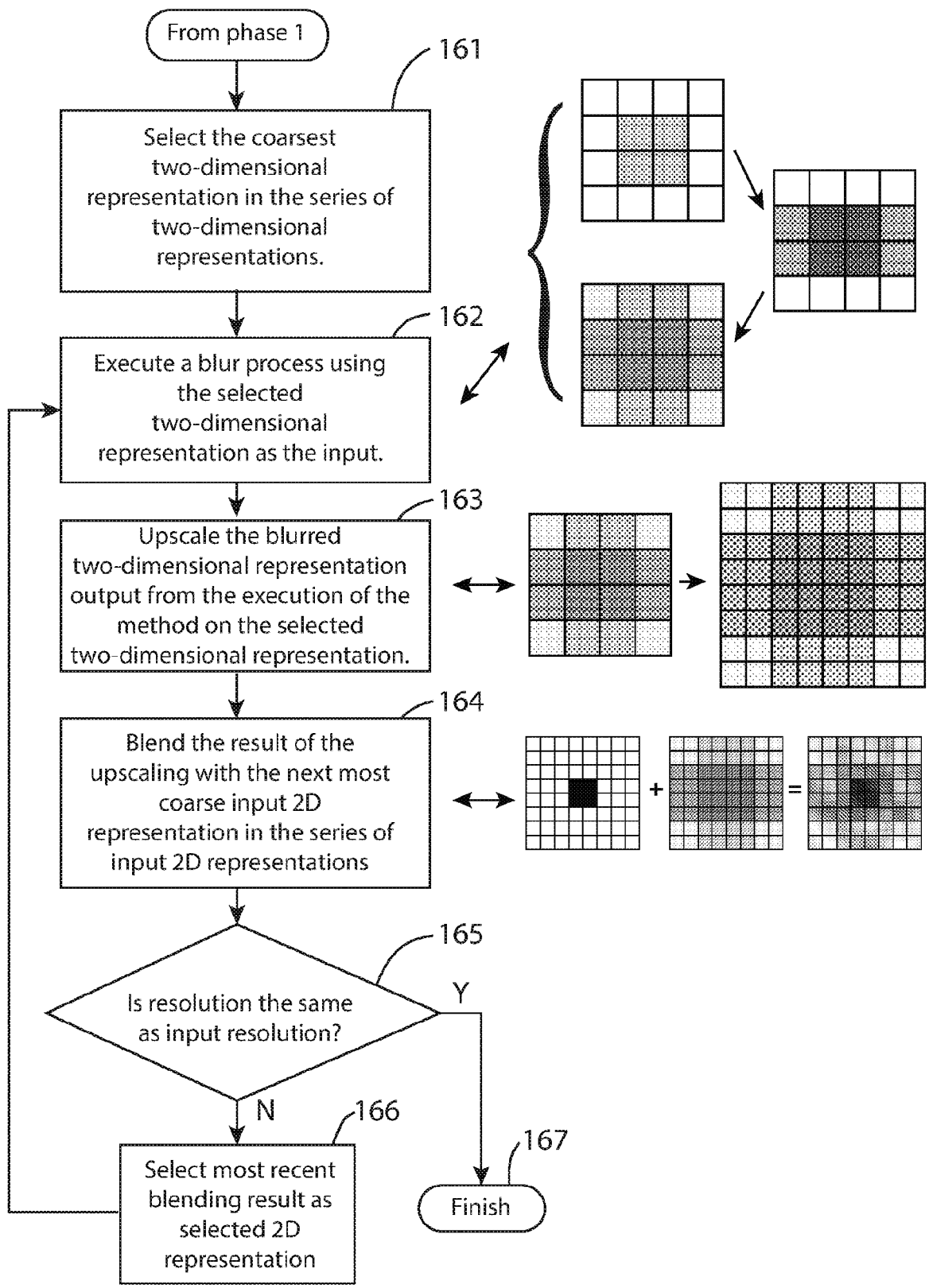

Another process which the present disclosure allows to be correctly implemented in image data representative of 360-degree spherical space is the use of repeated downsampling steps to sample pixels at great distance from the source pixel without the costly computational implications of doing so. FIGS. 13a and 13b illustrate how this works visually, and using flow charts.

In FIG. 13a, a first phase of this process is shown. First a source image is provided at full resolution. In other words in step 151, an input two-dimensional representation of 360-degree spherical image data is provided including a 2D array of pixels, each associated with a (θ,φ) coordinate pair. Next, at step 152, this source texture is stored in memory.

In step 153, a copy of the coarsest resolution available is downscaled by a user-determined factor. Usually this is 50% resolution in each linear dimension, resulting in an image having 25% of the pixels that the input image has, but in some cases, a user can choose the scaling ratio. The downscaled image is stored in memory at step 154.

At step 155, the process checks whether n versions are available in memory (in other words, have enough downscaling steps been performed). If not, the process returns to step 153 to further downscale and store image data. If enough downscaled copies are stored in memory (according to user preference), the method is prompted to carry on to phase 2 at step 156.

In phase 2, shown in FIG. 13b the blur effect is applied as two separate passes of orthogonal kernels, as described above, to the final result of downsampling. Phase 2 begins at step 161 by selecting the coarsest (lowest resolution) 2D representation from the series of 2D representations stored in memory from phase 1.

At step 162, a blur process is enacted on the selected 2D representation, in accordance with the methods discussed herein.

At step 163, the blurred output of step 162 is upsampled (e.g. using a bilinear interpolator) to the same resolution as the next lowest resolution image.

At step 164, the upsampled, blurred image is blended into the next lowest resolution image in the series stored in memory.

Step 165 checks whether the result of step 164 has returned to the same resolution as the original input image resolution. If not, the process selects the result of step 164 and returns to step 162 to repeat the processing steps on the output of step 164.

When the result of step 164 is that the resolution matches the original input resolution, then the method proceeds to step 167 and finishes.

This process is consequently many times more computationally efficient than a standard Gaussian blur because the same blur kernel (or at least one of the same size) can be used repeatedly on lower resolution images than the initial input, in which each pixel represents a large number of pixels in the original input resolution. Thus a wide blur is achieved without needing to sample many individual pixels.

The merging or blending of a blurred image with the next higher resolution image is performed with a blend weighting. These can be tailored by the user to provide the desired blur effect, by altering the weighting in the final output which is derived from pixels at a given blur distance.

It is common for image data to be provided as a cubemap image, yet as noted above processing steps are often performed on equirectangular representations. It may therefore be desirable to convert from a cubemap representation to an equirectangular representation prior to implementing the processing described above.

The process for making this conversion performed on a pixel by pixel basis as follows:

1. Convert the coordinates of the current texture (vector c) having x and y coordinates in the range 0 to 1 to spherical coordinates (in radians) over their corresponding ranges:

$$x\{0, 1\} \to \varphi\{0, 2\pi\}$$

$$y\{0, 1\} \to \theta\left\{-\frac{\pi}{2}, \frac{\pi}{2}\right\}$$

2. If φ>2π, subtract 2π to ensure that it exists in the range 0 to 2π
3. Convert spherical coordinate to a Cartesian vector on the unit sphere:

$$\vec{v} = (-\sin(\varphi) \cdot \cos(\theta), \sin(\theta), \cos(\theta) \cdot \cos(\varphi))$$

4. Convert the Cartesian vector to a unit vector
5. Find the absolute greatest component in the vector:

$$g = \max(|v_x|, |v_y|, |v_z|)$$

6. Iterate through each face and calculate if the component of the axis defining the face is equal to the greatest component g calculated in (5.). If it is, this is the face to sample.
7. Sample this face texture using the denormalised components. E.g. the front face is defined by any vector where the y-component is greatest. For the front face, the texture coordinates are calculated using the x- and z-components of the vector At the end of the processing steps (e.g. once blur has been applied), the output can be slotted back into the pipeline by converting back to the cubemap projection (complete with the graphical processing effect applied). In essence this involves reversing the steps set out above.

A further example of an improvement in this environment addresses the problem of applying processing steps such as blur close to the edge of a face, or close to a seam. In particular the equirectangular representation has a discontinuity at the equivalent points φ=0 and φ=2π. Attempting to apply blur across this discontinuity will generally result in a poor blur as the sampling procedure is poor at crossing such discontinuities. In the present application this is addressed by using two 2D representations, offset (or shifted) from one another by an azimuthal angle of Tr.

Figure 14:
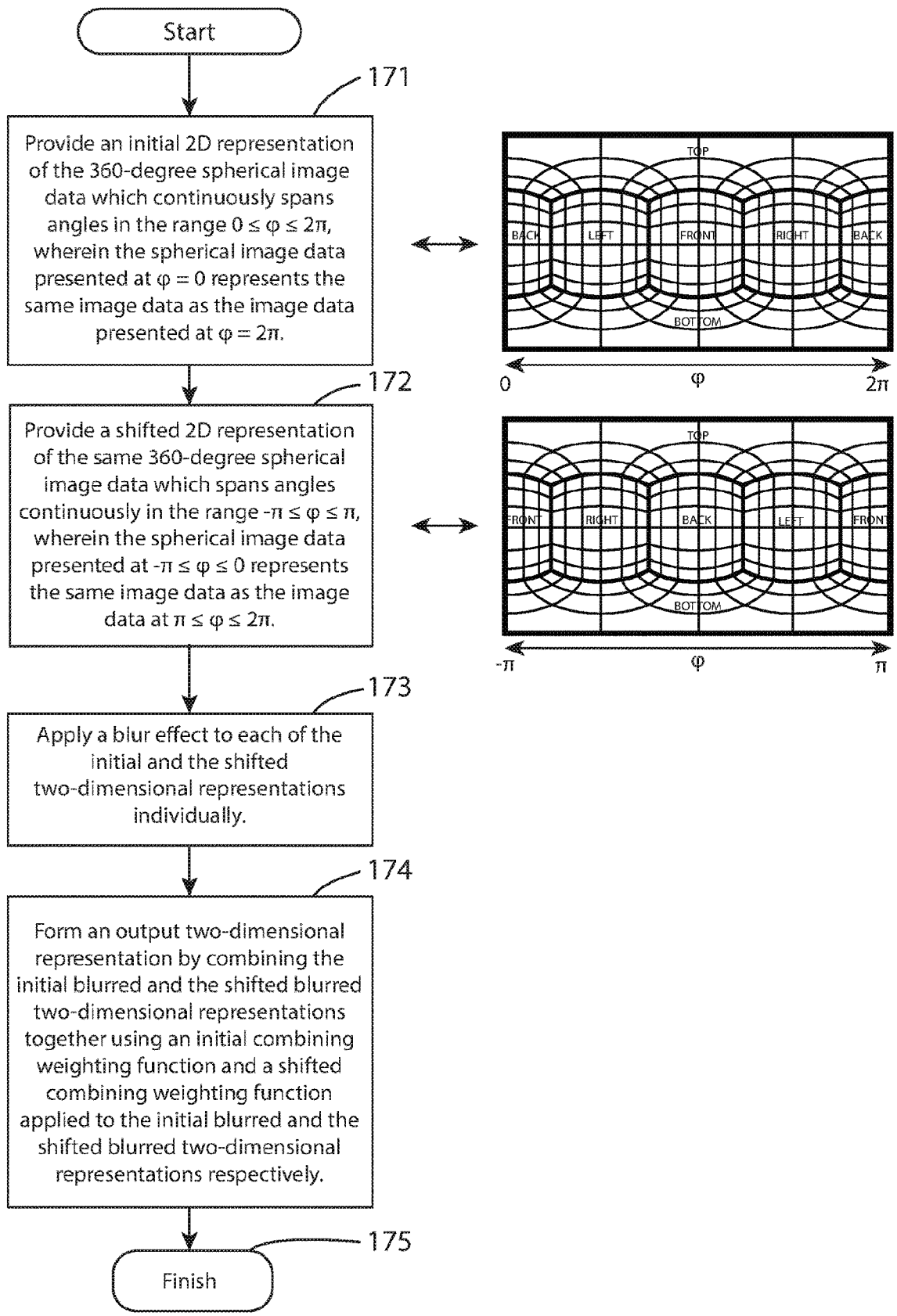
FIG. 14 is a flow chart illustrating a procedure for implementing processing effects across discontinuous boundaries.

FIG. 14 shows a flow chart along with pictorial representations of the steps, illustrating a method for addressing this issue. At step 171, the method begins as usual by providing an initial 2D representation of the 360-degree spherical image data which continuously spans angles in the range $0 \leq \varphi \leq 2\pi$ wherein the spherical image data presented at $\varphi=0$ represents the same image data as the image data presented at $\varphi=2\pi$. This is the minimum amount of space needed to represent the entirety of the image data, but leads to a discontinuity at $0=\varphi=2\pi$.

In step 172, a second representation is provided. More specifically, a shifted 2D representation of the same 360-degree spherical image data is provided, which spans angles continuously in the range $-\pi \leq \varphi \leq \pi$, wherein the spherical image data presented at $-\pi \leq \varphi \leq 0$ represents the same image data as the image data at $0 \leq \varphi \leq \pi$. In this example the offset between the two representations is evident in that the initial input has the "front" of the image in the centre of the representation, while the shifted representation has the "back" at the centre of the image. It can be seen that any point in the representation is never less than $\pi/2$ from a discontinuous edge in both representations. Points closer than $\pi/2$ to an edge in one representation are located close to the centre of the other representation. This means that at least one of the representations will be able to successfully implement a blur effect without encountering a discontinuity.

In step 173, a blur effect is applied to both the initial and shifted representations. This may be the blur methods described herein or other blur methods known in the art.

At step 174, an output two-dimensional representation is formed by combining the initial blurred and the shifted blurred two-dimensional representations together using an initial combining weighting function and a shifted combining weighting function applied to the initial blurred and the shifted blurred two-dimensional representations respectively. After step 174, the method ends at step 175.

Figure 15:
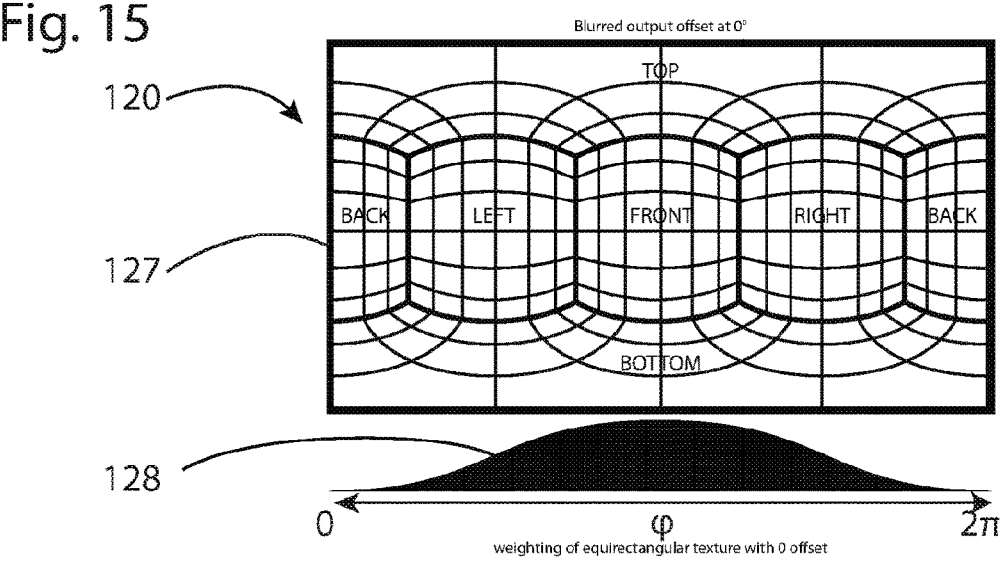
FIG. 15 illustrates the use of weighting functions set out in the flow chart of FIG. 14.
Figure 15:
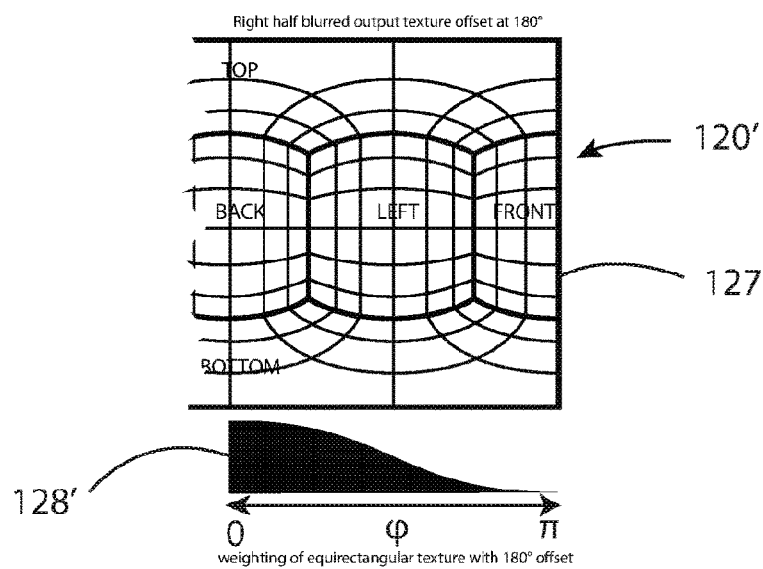
Figure 15:
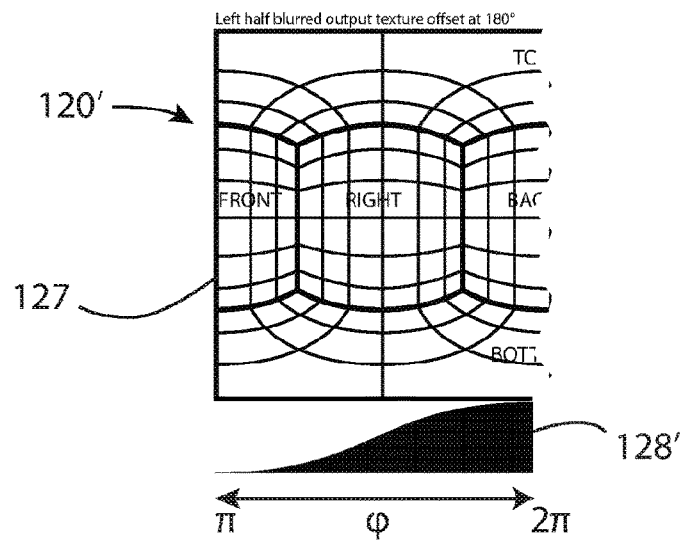

The detail of step 174 is shown in detail in FIG. 15. Here the initial 120 and shifted 120' representations are shown with corresponding $\varphi$ regions aligned vertically. The initial representation has a discontinuity 127 at $0=\varphi=2\pi$, but this corresponds to a continuous region of the shifted representation 120'. In fact this corresponds to the centre of the range of continuous $\varphi$ values in the shifted representation 120'. This situation is perfectly mirrored in that the shifted representation has a discontinuity 127' at $-\pi=\varphi=\pi$, but this corresponds to a continuous region in the centre of the range of continuous $\varphi$ of the initial representation 120.

The initial representation 120 has an initial combining function 128 which specifies weights for combining the two functions as set out in step 174 of FIG. 14. This initial combining function 128 has a minimum weight at $0=\varphi=2\pi$, where its discontinuity 127 is and a maximum weight at $\varphi=\pi$, in the middle of the continuous $\varphi$ region for the initial view 120.

Similarly the shifted representation 120' has a shifted combining function 128' which specifies weights for combining the two functions as set out in step 174 of FIG. 14. This shifted combining function 128' has a minimum weight at $-\pi=\varphi=\pi$, where its discontinuity 127' is and a maximum weight at $0=\varphi=2\pi$, in the middle of the continuous $\varphi$ region for the shifted view 120'.

The methods set out above (or indeed other processing/blurring methods) are therefore implemented on both the initial and the shifted representation at the same time. Once a blurred version of each representation has been obtained, the two representations are combined together using a different $\varphi$-dependent weighting function 128, 128'. Each weighting function 128, 128' is chosen so that the weighting function 128 applied to the initial representation 120 (after processing effects have been applied) has a minimum at the discontinuity 127, i.e. at $\varphi=0$ and at $\varphi=2\pi$. Similarly, the weighting function 128' applied to the u-shifted representation 120' has a minimum at the discontinuity 127' for that representation 120', i.e. at $\varphi=-\pi$ and at $\varphi=\pi$. In this way, incorrect application of blur due to a discontinuity is filtered out and does not appear in the final output.

It is common, for example for the weighting functions to have a weight of zero at their discontinuity, but this is not essential as long as the weight is low enough to not be noticeable (e.g. because the processing effect is dominated in that region by the blending in of the other representation, having a stronger weighting in that region). Usually the weighting functions have a maximum value in the centre of their respective view (at $\varphi=\pi$ for the initial representation and at $\varphi=0$ for the shifted representation), for example a value of 1.

The two combining weighting functions 128, 128' can be chosen such that they sum to a constant value (again, usually 1) at all values of $\varphi$. Once a suitable weighting function $f(\varphi)$ for one representation has been found, it is trivial to form a complementary one which sums to a constant value a, as this will simply be $a-f(\varphi)$.

As an example, two complementary weighting functions are:

$$\frac{1-\cos\varphi}{2} \text{ and } \frac{1+\cos\varphi}{2}$$

in which the first of these has minima at $\varphi=0$ and at $\varphi=2\pi$, so is suitable for using as an initial representation combining weighting function and the second has minima at $\varphi=-\pi$ and at $\varphi=\pi$ so can be used as a shifted representation combining weighting function. This function is shown in the context of applying combining weighting functions in FIG. 15.

Figure 16A:
FIGS. 16A to 16C illustrate an example of the various processes described herein operating together.
Figure 16A:
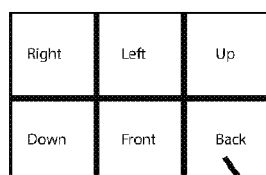
Figure 16A:
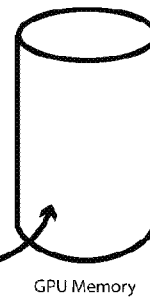
Figure 16A:
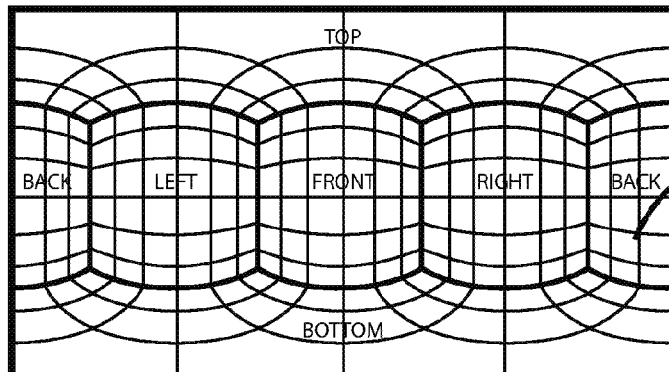
Figure 16A:
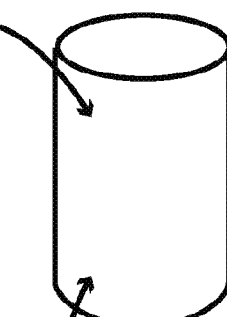
Figure 16A:
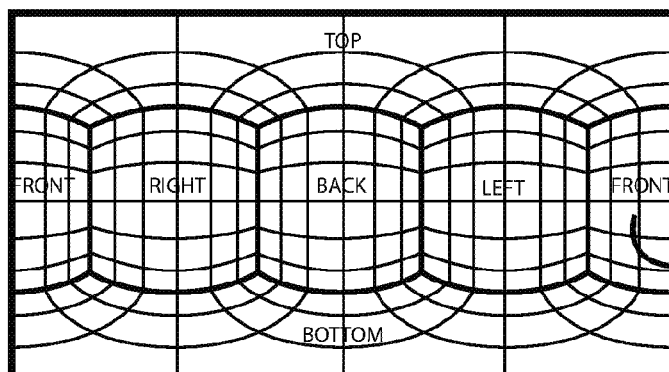
Figure 16A:
Figure 16B:
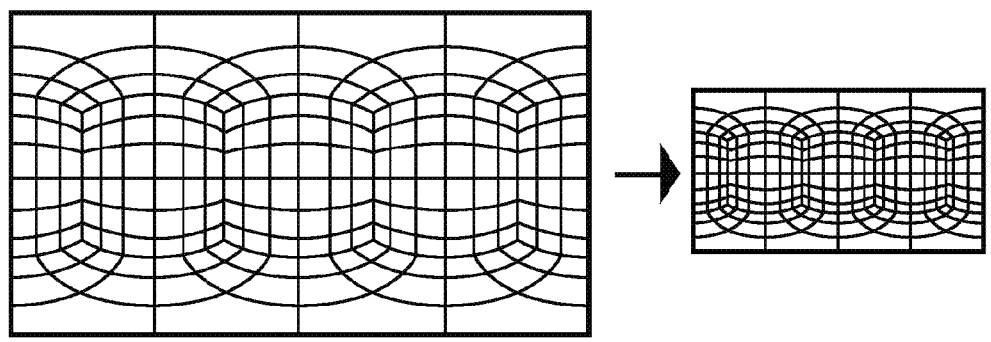
Figure 16B:
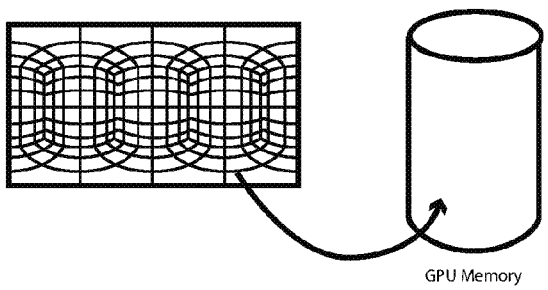
Figure 16C:
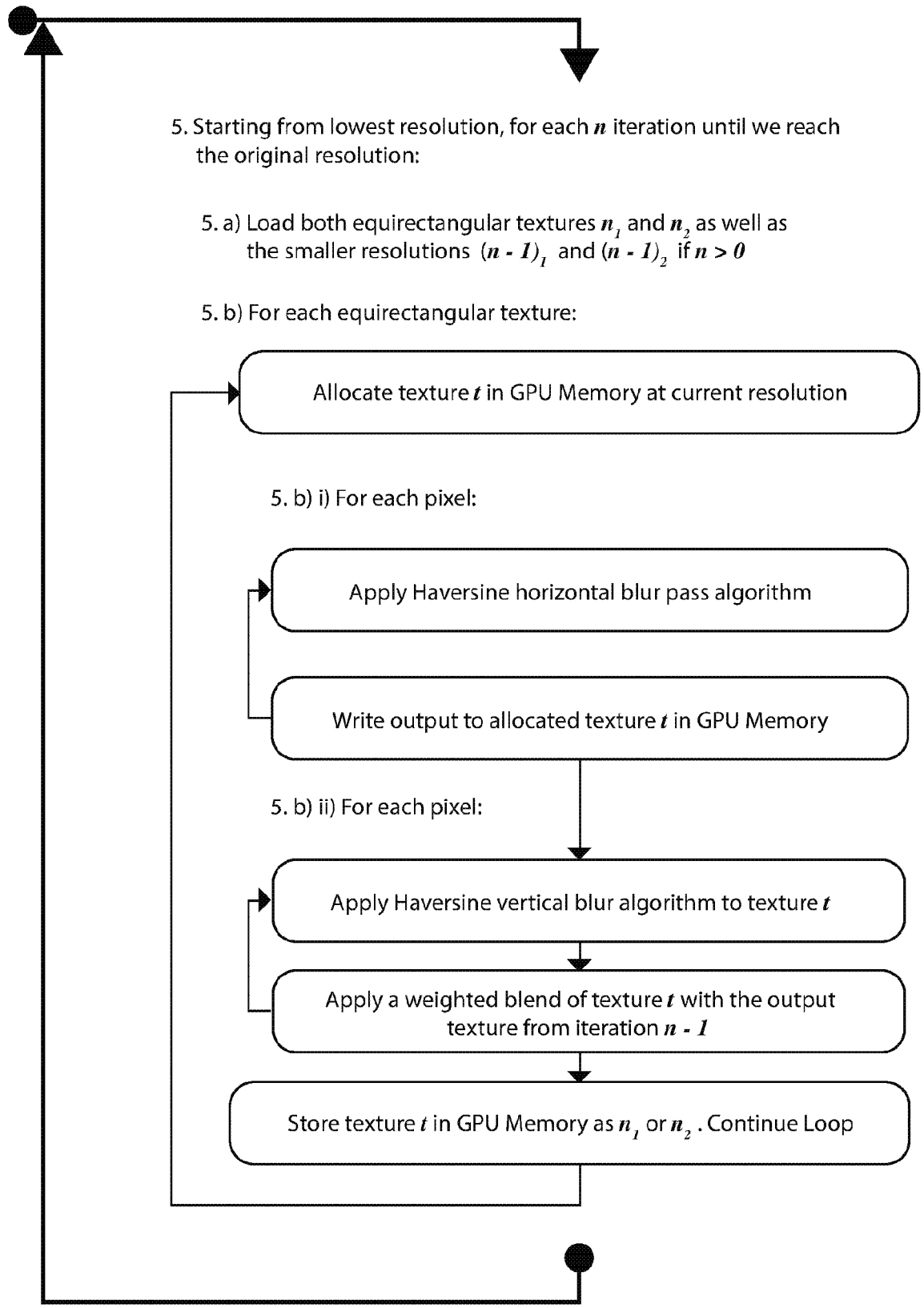

Drawing all of this together, an example of an overall process incorporating all of these features is shown in FIGS. 16*a* to 16*c*. The process starts in FIG. 16*a* at step 1 by generating a Gaussian array such as that illustrated in FIG. 9.

Then at step 2, input image data is received in a cubemap format. This is processed in step 3 to generate a pair of equirectangular projections, offset from one another by an angle $\pi$ in azimuthal angle $\varphi$. Each of these projections is stored independently in GPU memory. See FIG. 14 for more detail.

Turning now to FIG. 16*b*, the process continues with steps 4*a* to 4*c*. In turn these involve repeatedly downscaling each of the equirectangular representations and storing the downscaled version. This process is repeated as often as necessary to obtain the desired number of downscaled samples. See FIG. 13*a* for more detail on this process.

The process continues again in FIG. 16*c*. Starting with the lowest resolution downscaled sample (corresponding to the initial and shifted equirectangular projections formed in step 3) horizontal and vertical blur passes are applied across the texture. See FIGS. 11*a* to 11*e* for more detail. Note that horizontal and vertical are convenient shorthand for applying two orthogonal blur arrays sequentially to the entire pixel array, in order to convolve the two blur arrays and blur an area. Once the blur process has been completed at that resolution, each of the results from the process performed on the initial and shifted data sets is blended into the next higher resolution image for the corresponding (initial or shifted) data set. The process loops until no higher resolution is available. See FIG. 13*b* for more detail.

Once the final blur step has been implemented, the initial and shifted outputs are blended together using a weighting function to reduce artefacts from discontinuities, as set out in detail in FIGS. 14 and 15. This completes the implementation of a natural looking blur across image data representative of 360 degree spherical space. In the case where the image data forms part of a video stream, the process repeats using a subsequent video frame. Note that the flow chart in FIGS. 16a to 16c represents one manner in which all the steps disclosed herein may be performed. As will be apparent from the foregoing, not all of these steps need be performed at all (or in the order presented) to obtain some of the advantages disclosed herein.

Figure 17:
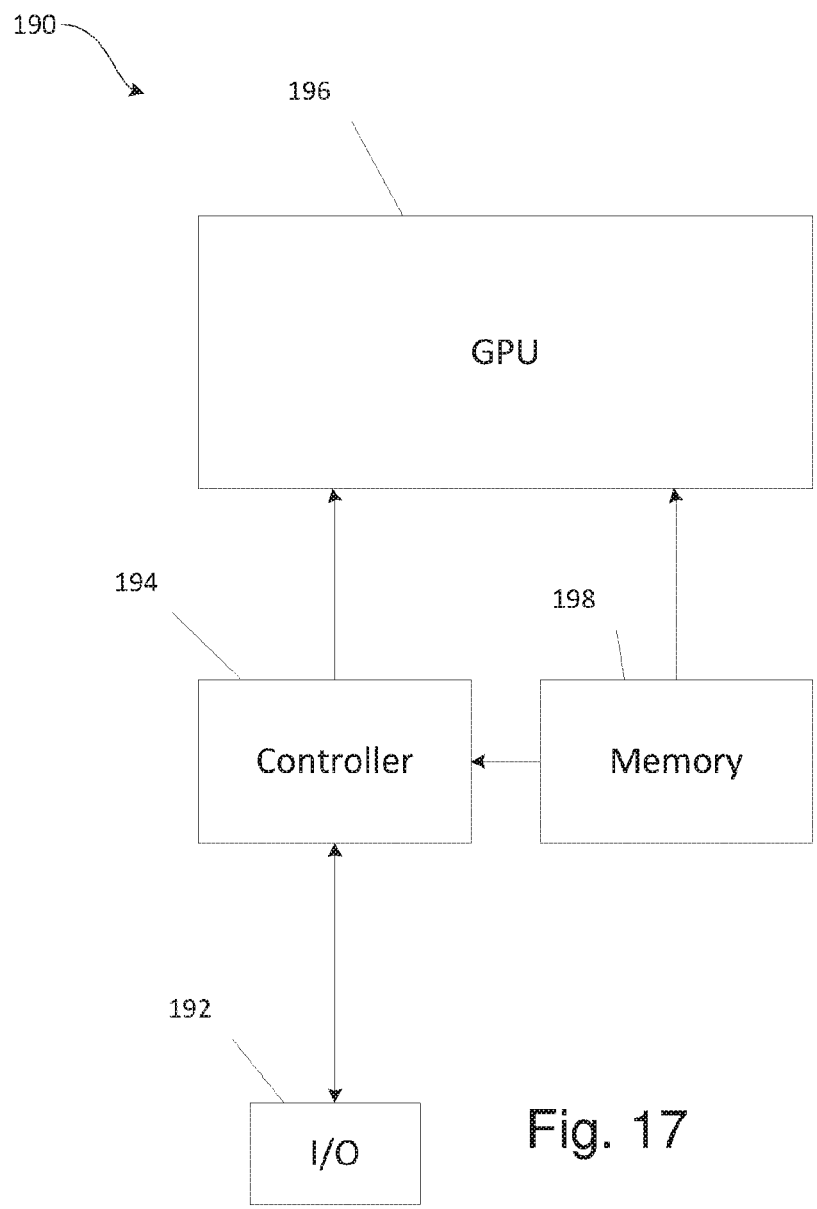
FIG. 17 shows an example of a computer system on which the various methods disclosed herein may be executed.

Finally, FIG. 17 illustrates a hardware arrangement 190 suitable for implementing the method. An input/output (I/O) device 192 provides image data from a pipeline. I/O device 192 may be a remote server, a network device or a local data storage device for example. A controller 194 receives data from the I/O device and handles the data until it is ready to be processed. In some cases, controller 194 performs some pre-processing steps, if this is desirable, to package the data in a format which is useful to the rest of the hardware 190.

The controller 194 has access to a memory 198, in which data may be stored temporarily or permanently. In addition computer readable instructions may be stored in the memory 198 to cause the hardware 190 (and in particular the controller 194 and/or a graphical processing unit (GPU) 196) to execute any of the variants of the method disclosed herein. The controller 194 is in communication with the GPU 196. The GPU 196 may be specifically designed for graphical processing or it may be a standard all-purpose processor. Under instruction from the controller 194, the GPU runs instructions to cause the processing of image data received form the I/O device 192 in line with the disclosure herein. The GPU has access to memory 198 to store image data generated as part of the intermediate steps. In some cases, GPU 198 and controller 194 have access to different memory, for example GPU 198 has its own on-board memory.

The hardware arrangement shown in FIG. 17 is illustrative only, and it will be apparent that deviations from this specific arrangement may still allow appropriate instructions to be executed to cause the methods described herein to run.

By utilising the advantageous features set out herein the method is capable of applying long range blurring in a natural manner in real time to high resolution and high framerate video content.

The invention claimed is:

1. A method of applying a blur effect to image data representative of a 360-degree spherical space, the method comprising:
(1) providing an input two-dimensional representation of the 360-degree spherical image data, the two-dimensional representation including a two-dimensional array of pixels, each pixel being associated with a $(\theta,\varphi)$ coordinate pair, where $\theta$ is a polar angle and $\varphi$ is an azimuthal angle in a spherical polar coordinate representation of the 360-degree spherical image data;
(2) creating a blurred two-dimensional representation of the 360-degree spherical image data by:
   (a) defining one or more blur arrays having weighting values for samples taken within a blur area around a source pixel;
   (b) identifying a source pixel in the input two-dimensional representation to which the blur effect is to be applied, the source pixel being associated with a spherical coordinate pair $(\theta_0,\varphi_0)$;
   (c) defining a first great circle and a second great circle in the spherical polar coordinate representation, wherein the first and second great circles intersect orthogonally at $(\theta_0,\varphi_0)$;
   (d) extracting a first spherical coordinate pair $(\theta_1,\varphi_1)$ spaced away from $(\theta_0,\varphi_0)$ around the first great circle a first distance $d_1$ in a first direction and identifying a first location in the input two-dimensional representation corresponding to $(\theta_1,\varphi_1)$;
   (e) extracting a second spherical coordinate pair $(\theta_2,\varphi_2)$ spaced away from $(\theta_0,\varphi_0)$ around the first great circle a second distance $d_2$ in a second direction opposite the first direction and identifying a second location in the input two-dimensional representation corresponding to $(\theta_2,\varphi_2)$;
   (f) extracting a third spherical coordinate pair $(\theta_3,\varphi_3)$ spaced away from $(\theta_0,\varphi_0)$ around the second great circle a third distance $d_3$ in a third direction and identifying a third location in the input two-dimensional representation corresponding to $(\theta_3,\varphi_3)$;
   (g) extracting a fourth spherical coordinate pair $(\theta_4,\varphi_4)$ spaced away from $(\theta_0,\varphi_0)$ around the second great circle a fourth distance $d_4$ in a fourth direction opposite the third direction and identifying a fourth location in the input two-dimensional representation corresponding to $(\theta_4,\varphi_4)$;
   (h) writing a blurred pixel value to a blurred pixel having a location associated with $(\theta_0,\varphi_0)$ in the blurred two-dimensional representation of the 360-degree spherical image data, the blurred pixel value being a weighted average of pixel values in the input two-dimensional representation encompassed within an area having as its outer extent each of the first, second, third and fourth locations, the weightings for each pixel within the area being derived from the one or more blur arrays.

2. The method of claim 1, further comprising the step of:
(3) merging the value of each pixel in the blurred two-dimensional representation into a corresponding pixel in the input two-dimensional representation.

3. The method of claim 1, wherein in step (b) a plurality of source pixels are identified in the input two-dimensional representation to which the blur effect is to be applied, and step (2) is performed on each of the source pixels in turn to form the blurred two-dimensional representation.

4. The method of claim 1, wherein in step (b) every pixel in the input two-dimensional representation is identified as a source pixel to which the blur effect is to be applied; wherein
step (h) is achieved by performing steps (b) to (g) for each of the source pixels to form the blurred two-dimensional representation; wherein
step (a) includes defining a first blur array having weighting values for samples taken along the first great circle and defining a second blur array having weighting values for samples taken along the second great circle; and wherein
the method further includes forming an intermediate two-dimensional representation by:
as part of step (d):
(d1) extracting further spherical coordinate pairs $(\theta_{i,1}, \varphi_{i,1})$ to form a first series of spherical coordinate pairs spaced away progressively further from $(\theta_0,\varphi_0)$ around the first great circle in the first direction up to the first distance $d_1$ away from $(\theta_0,\varphi_0)$, the first series comprising a total of $n_1$ entries;

(d2) identifying a series of locations in the input two-dimensional representation corresponding to each of the $n_1$ entries;

(d3) associating each of the $n_1$ entries with a corresponding weighting value from the first blur array;

(d4) extracting a sample from the input two-dimensional representation at a location associated with each of the spherical coordinate pairs $(\theta_{i,1},\varphi_{i,1})$;

(d5) multiplying each sample by its corresponding weighting value from the first blur array; and (d6) summing the result of each multiplication in (d5) and storing the sum in an intermediate pixel having a location associated with $(\theta_0,\varphi_0)$ in an intermediate array of pixels; and as part of step (e):

(e1) extracting further spherical coordinate pairs $(\theta_{i,2},\varphi_{i,2})$ to form a second series of spherical coordinate pairs spaced progressively further away from $(\theta_0,\varphi_0)$ around the first great circle in the second direction up to the second distance $d_2$ away from $(\theta_0,\varphi_0)$, the second series comprising a total of $n_2$ entries;

(e2) identifying a series of locations in the input two-dimensional representation corresponding to each of the $n_2$ entries;

(e3) associating each of the $n_2$ entries with a corresponding weighting value from the first blur array;

(e4) extracting a sample from the input two-dimensional representation from a location associated with each of the spherical coordinate pairs $(\theta_{i,2},\varphi_{i,2})$;

(e5) multiplying each sample by its corresponding weighting value from the first blur array;

(e6) summing the result of each multiplication in (e5) and adding the sum to the value stored in the intermediate pixel;

(e7) adding to the value stored in the intermediate pixel a pixel value indicative of the value of the source pixel in the input two-dimensional representation multiplied by a source pixel weighting value; and repeating steps (d) and (e) including their sub-steps (d1) to (d6), (e1) to (e7) for each pixel in the input two-dimensional representation to form the intermediate two-dimensional array of pixels;

and wherein the method further includes:

as part of step (f):

(f1) extracting further spherical coordinate pairs $(\theta_{i,3},\varphi_{i,3})$ to form a third series of spherical coordinate pairs spaced progressively further away from $(\theta_0,\varphi_0)$ around the second great circle in the third direction up to the third distance $d_3$ away from $(\theta_0,\varphi_0)$, the third series comprising a total of $n_3$ entries;

(f2) identifying a series of locations in the input two-dimensional representation corresponding to each of the $n_3$ entries;

(f3) associating each of the $n_3$ entries with a corresponding weighting value from the second blur array;

(f4) extracting a sample from the intermediate two-dimensional representation from a location associated with each of the spherical coordinate pairs $(\theta_{i,3},\varphi_{i,3})$;

(f5) multiplying each sample by its corresponding weighting value from the second blur array; and (f6) summing the result of each multiplication in (f5) and storing the sum in an output pixel having a location associated with $(\theta_0,\varphi_0)$ in an output two-dimensional array of pixels; and as part of step (g):

(g1) extracting further spherical coordinate pairs $(\theta_{i,4},\varphi_{i,4})$ to form a fourth series of spherical coordinate pairs spaced progressively further away from $(\theta_0,\varphi_0)$ around the second great circle in the fourth direction up to the fourth distance away from $(\theta_0,\varphi_0)$, the fourth series comprising a total of $n_4$ entries;

(g2) identifying a series of locations in the input two-dimensional representation corresponding to each of the $n_4$ entries;

(g3) associating each of the $n_4$ entries with a corresponding weighting value from the second blur array;

(g4) extracting a sample from the input two-dimensional representation from a location associated with each of the spherical coordinate pairs $(\theta_{i,4},\varphi_{i,4})$;

(g5) multiplying each sample by its corresponding weighting value from the second blur array;

(g6) summing the result of each multiplication in (g5) and adding the sum to the value stored in the output pixel;

(g7) adding to the value stored in the output pixel a pixel value indicative of the value of the source pixel in the input two-dimensional representation multiplied by a source pixel weighting value; and wherein steps $\varphi$ and (g) and their sub-steps (f1) to (f6), (g1) to (g7) are repeated for each pixel in the intermediate two-dimensional array, resulting in the output two-dimensional array of pixels being the blurred two-dimensional representation of step (h) in which each pixel in the input two-dimensional representation has been processed to provide a corresponding blurred pixel in the blurred two-dimensional representation.

5. The method of claim 4, wherein at least one of the series of coordinate pairs is evenly spaced along its corresponding great circle.

6. The method of claim 4, wherein $n_1=n_2$ and/or $n_3=n_4$.

7. The method of claim 4, wherein $n_1=n_3$ and $n_2=n_4$.

8. The method of claim 4, wherein $n_1=n_2=n_3=n_4$.

9. The method of claim 1, further including a filtering step performed prior to the execution of the method, the filtering step classifying each pixel in the input two-dimensional representation into at one of least two categories such that:

locations in the input two-dimensional array corresponding to pixels in a first category are overwritten with empty pixels; and pixels from the input two-dimensional representation corresponding to pixels in a second category, different to the first category, are not modified.

10. The method of claim 1, wherein the spherical coordinate pairs are calculated using the reverse haversine formula; wherein, for each spherical coordinate pair:

the distance of the spherical coordinate pair from $(\theta_0,\varphi_0)$ along its corresponding great circle is used as a distance input to the reverse haversine formula; and an angle between the corresponding great circle and a great circle of constant $\varphi$ measured at $(\theta_0,\varphi_0)$, the angle being the clockwise angle measured from the positive $\theta$ direction of the great circle of constant $\varphi$ to the portion of the corresponding great circle on which the spherical coordinate pair lies is used as a bearing input to the reverse haversine formula.

11. The method of claim 1, wherein the first great circle is a great circle having exactly two values of $\varphi$ around its full circumference.

12. The method of claim 1, wherein the 360-degree spherical image data is a single frame of a video and the method includes repeating the method for at least one subsequent video frame.

13. The method of claim 1, wherein the weighting values in at least one of the one or more blur arrays follows a Gaussian approximation.

14. The method of claim 1, wherein prior to implementing the method:
- raw input two-dimensional image data is successively downscaled one or more times to form a series of two or more two-dimensional representations at progressively coarser resolution, the method further including:
- starting with the coarsest two-dimensional representation in the series of two-dimensional representations as a selected two-dimensional representation:
- executing the method of claim of any preceding claim on the selected two-dimensional representation as the input two-dimensional representation;
- upscaling the blurred two-dimensional representation output from the execution of the method on the selected two-dimensional representation;
- blending the result of the upscaling with the next most coarse input two-dimensional representation in the series of input two-dimensional representations;
- using the result of the blending step as a selected input two-dimensional representation and repeating the executing, upscaling, blending and using steps until on the final execution step the selected two-dimensional representation is based on the second least coarse two-dimensional representation and the final blending step blends the upscaled blurred two-dimensional representation with the raw input two-dimensional image data.

15. The method of claim 1, comprising taking as an input a cubemap representation of the 360-degree spherical image data and prior to implementing the method of claim 1, converting the cubemap representation to the input two-dimensional representation of the 360-degree spherical image data.

16. A computer product comprising a non-transitory computer readable storage medium having program instructions embodied therewith, the program instructions executable by a computer to cause the computer to implement the steps of the method of claim 1.

17. A processor or distributed processing system coupled to a memory in which instructions are stored, the instructions when executed being operable to cause the processor or distributed processing system to implement the steps of the method of claim 1.

* * * * *